United States Patent
Isoya et al.

(10) Patent No.: US 12,096,114 B2
(45) Date of Patent: Sep. 17, 2024

(54) INFORMATION PROCESSING DEVICE, INFORMATION PROCESSING METHOD, AND PROGRAM

(71) Applicant: Sony Group Corporation, Tokyo (JP)

(72) Inventors: Toshiaki Isoya, Tokyo (JP); Masahiko Minagawa, Tokyo (JP); Hiroaki Yamaguchi, Tokyo (JP); Hiroshi Kanma, Tokyo (JP)

(73) Assignee: Sony Group Corporation, Tokyo (JP)

( * ) Notice: Subject to any disclaimer, the term of this patent is extended or adjusted under 35 U.S.C. 154(b) by 271 days.

(21) Appl. No.: 17/636,698

(22) PCT Filed: Aug. 7, 2020

(86) PCT No.: PCT/JP2020/030427
§ 371 (c)(1),
(2) Date: Feb. 18, 2022

(87) PCT Pub. No.: WO2021/039366
PCT Pub. Date: Mar. 4, 2021

(65) Prior Publication Data
US 2022/0294972 A1    Sep. 15, 2022

(30) Foreign Application Priority Data
Aug. 29, 2019 (JP) .................................. 2019-157230

(51) Int. Cl.
*H04N 23/66*    (2023.01)
*G06F 9/451*    (2018.01)
(Continued)

(52) U.S. Cl.
CPC ............. *H04N 23/66* (2023.01); *G06F 9/451* (2018.02); *H04L 67/06* (2013.01);
(Continued)

(58) Field of Classification Search
CPC .......... H04N 1/00202; H04N 1/00244; H04N 2201/0084; H04N 23/66; H04L 67/06; H04L 67/1097; G06F 9/451
See application file for complete search history.

(56) References Cited

U.S. PATENT DOCUMENTS 7,954,130 B2 *  5/2011  Yanai ................... H04N 23/661
                                              725/105
7,958,269 B2 *  6/2011  Nakamura ................ H04L 9/40
                                              709/247
(Continued)

FOREIGN PATENT DOCUMENTS

CN    107666523 A    2/2018
JP    2002354322 A   12/2002
(Continued)

OTHER PUBLICATIONS

International Search Report issued Nov. 23, 2020 in PCT/JP2020/030427, filed on Aug. 7, 2020, 3 pages.
(Continued)

*Primary Examiner* — Marly S Camargo
(74) *Attorney, Agent, or Firm* — Oblon, McClelland, Maier & Neustadt, L.L.P.

(57) ABSTRACT

Facilitation of FTP settings on an imaging device side. An information processing device executes user interface processing of presenting a communicable imaging device and enabling an operation to designate an imaging device to serve as a transfer destination, and communication control processing of executing transfer of FTP setting information to the imaging device designated by the user interface processing.

16 Claims, 25 Drawing Sheets

(51) Int. Cl.
*H04L 67/06* (2022.01)
*H04N 1/00* (2006.01)
(52) U.S. Cl.
CPC ..... *H04N 1/00209* (2013.01); *H04N 1/00244* (2013.01); *H04N 2201/0084* (2013.01)

(56) References Cited

U.S. PATENT DOCUMENTS

| | | | | |
|---|---|---|---|---|
| 8,477,202 | B2* | 7/2013 | Asano | H04N 23/661 |
| | | | | 348/211.2 |
| 10,075,613 | B2* | 9/2018 | Nonaka | H04N 67/30 |
| 2001/0017655 | A1* | 8/2001 | Araki | H04N 7/14 |
| | | | | 348/211 |
| 2005/0131923 | A1 | 6/2005 | Noguchi | |
| 2017/0035005 | A1* | 2/2017 | Nonaka | H04N 67/30 |
| 2017/0164415 | A1 | 6/2017 | Sato | |

FOREIGN PATENT DOCUMENTS

| | | |
|---|---|---|
| JP | 2004104372 A | 4/2004 |
| JP | 2004147017 A | 5/2004 |
| JP | 2006287856 A | 10/2006 |
| JP | 2007201579 A | 8/2007 |
| JP | 2007286664 A | 11/2007 |
| JP | 2008053773 A | 3/2008 |
| JP | 2009065561 A | 3/2009 |
| JP | 2011147151 A | 7/2011 |
| JP | 2017011662 A | 1/2017 |
| JP | 2017-138777 A | 8/2017 |
| JP | 2019050530 A | 3/2019 |

OTHER PUBLICATIONS

Anonymous: Configure Wansview NCM625GA Pro HD 1080P Pan/Tilt WiFi Camera to upload image snapshots/video clips to FTP/SMTP Server for cloud recording11, May 9, 2019 (May 9, 2019) XP055746688 Retrieved from the Internet: URL:https://web.archive.org/web/2019050907 4408/https://www.cameraftp.com/CameraFTP/Support/Wansview_NCM625GA_FullHD_CloudRecording.aspx [retrieved on Nov. 3, 2020], (9 total pages).
Sony Corporation: 5. FTP upload | How to use | Transfer & Tagging add-on : Sony, Aug. 10, 2019 (Aug. 10, 2019), XP055746707, Retrieved from the Internet: URL:https://web.archive.org/web/2019081000 3833/http://support.d imaging.sony.eo.jp/a pp/transfer/en/instruction/5_ftp.php#cntl [retrieved on Nov. 3, 2020] pp. 1-20.

* cited by examiner

FIG. 3

| | FTP SETTINGS | |
|---|---|---|
| SERVER 1 | | ABC |
| SERVER 2 | | DEFF |
| SERVER 3 | | XYZ, LTD |
| SERVER 4 | | myhome |
| SERVER 5 | | SETTING 5 |
| SERVER 6 | | SETTING 6 |
| SERVER 7 | | SETTING 7 |

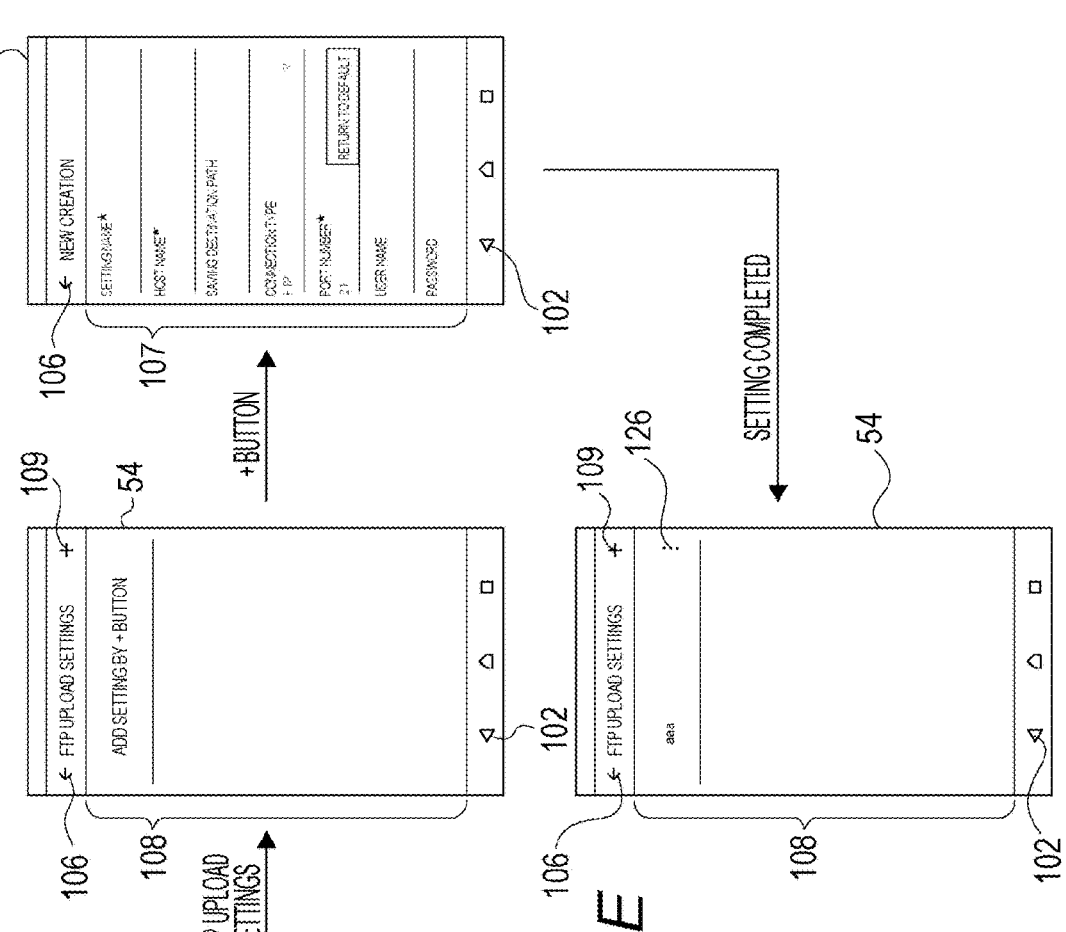
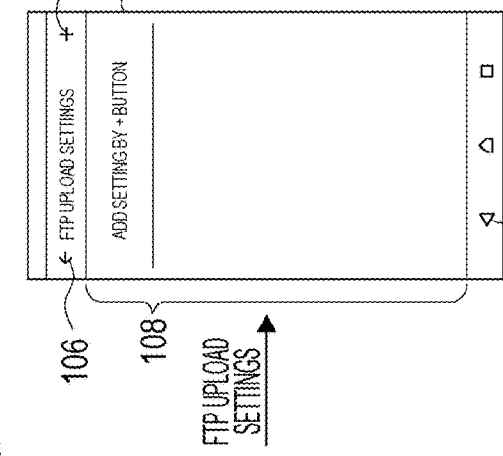
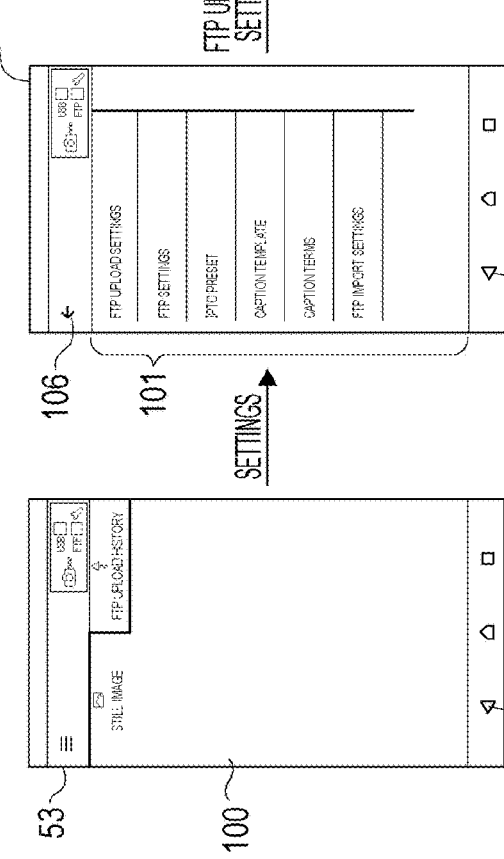

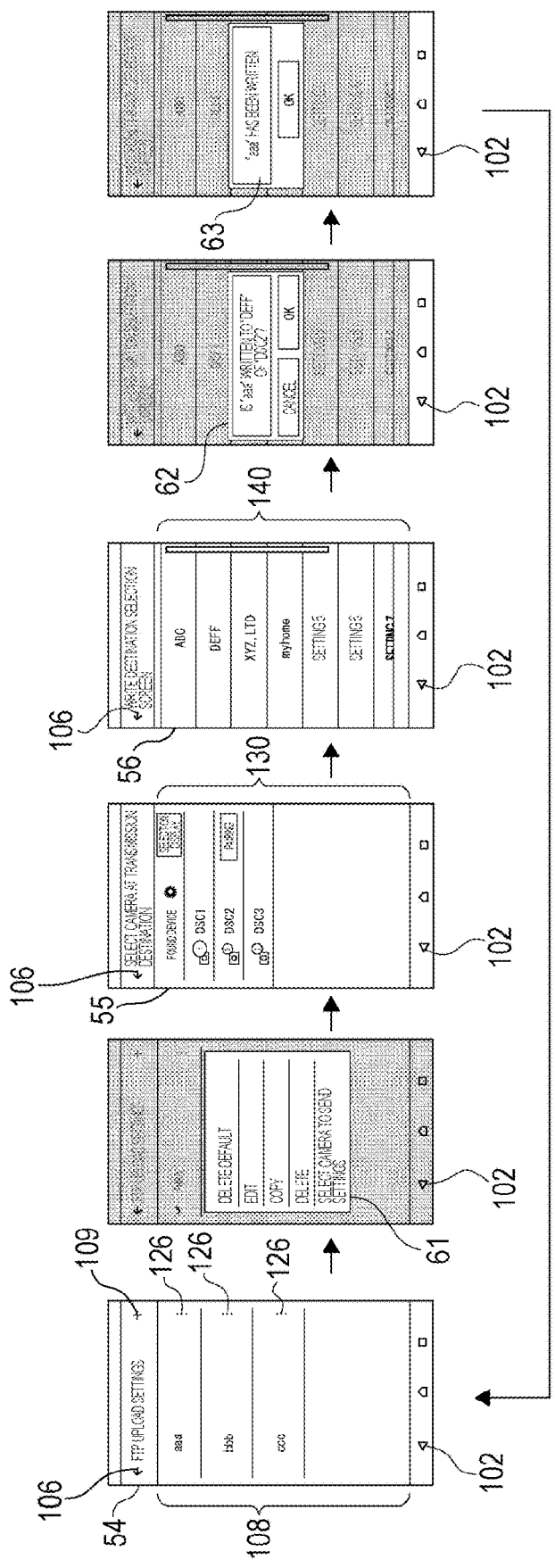

FIG. 13A

WRITE DESTINATION SELECTION SCREEN — 56
141
ABC
DEFF
XYZ, LTD
myhome
SETTING 5
SETTING 6
SETTING 7
106
140
102

FIG. 13B

WRITE DESTINATION SELECTION SCREEN — 56
141
SERVER 1    ABC
SERVER 2    DEFF
SERVER 3    XYZ, LTD
SERVER 4    myhome
SERVER 5    SETTING 5
SERVER 6    SETTING 6
SERVER 7    SETTING 7
106
140
102

FIG. 13C

WRITE DESTINATION SELECTION SCREEN — 56
141
FTP SETTING 1
FTP SETTING 2
FTP SETTING 3
FTP SETTING 4
FTP SETTING 5
FTP SETTING 6
FTP SETTING 7
106
140
102

INFORMATION PROCESSING DEVICE, INFORMATION PROCESSING METHOD, AND PROGRAM

CROSS REFERENCE TO RELATED APPLICATIONS

This application claims the benefit of Japanese Priority Patent Application JP 2019-157230 filed on Aug. 29, 2019, the entire contents of which are incorporated herein by reference.

TECHNICAL FIELD

The present technology relates to an information processing device, an information processing method, and a program, and more particularly to a technology for communication settings of an imaging device.

BACKGROUND ART

In a case of a user who uses an imaging device (also referred to as a "camera") such as a professional photographer or a journalist, the user uploads images captured with the imaging device to a server (for example, a file transfer protocol (FTP) server) of a newspaper company or the like, using a communication function of the imaging device, on the spot.

In that case, the imaging device needs to store FTP settings for uploading images to a specific FTP server.

PTL 1 discloses a technology regarding transfer of setting information from one camera to another camera.

CITATION LIST

Patent Literature

PTL 1: JP 2017-138777A

SUMMARY

Technical Problem

By the way, normally, an imaging device has few opportunities to receive character input and is not provided with an operator or interface convenient for the character input. In the case of character input, an operation of selecting characters with a cursor or the like while sequentially displaying characters in a list needs to be performed.

Meanwhile, content of the FTP settings include an FTP server host name, a saving destination path, a user name, a password, a connection type, and the like, and registration of FTP setting information including these items needs input of a large number of characters. For this reason, input of the FTP setting information is extremely troublesome and difficult in the imaging device.

Therefore, the present technology proposes a technology for enabling a user who needs construction of an environment of uploading images using FTP settings, such as a professional photographer, to easily realize the FTP settings in an imaging device.

Solution to Problem

The information processing device according to the present technology includes a user interface control unit configured to perform user interface processing of presenting a communicable imaging device and enabling an operation to designate an imaging device to serve as a transfer destination, and a communication control unit configured to execute transfer of FTP setting information to the imaging device designated by the user interface processing.

That is, FTP settings held in the information processing device can be transferred to the imaging device designated by the user.

In the above-described information processing device, it is conceivable to include an FTP setting management unit configured to create FTP setting information according to an input in an input environment for creating the FTP setting information to be provided by the user interface control unit.

That is, the FTP setting information is made able to be created according to user input in the information processing device. Note that, as provision of the input environment, causing a display unit to execute screen display for input and to accept sound input by a voice of the user, or the like is assumed.

In the above-described information processing device, it is conceivable to include an FTP setting management unit configured to edit FTP setting information according to an input in an input environment for editing the FTP setting information provided by the user interface control unit.

That is, the FTP setting information stored in the information processing device can be edited, updated, or set as new FTP setting information by the user input.

In the above-described information processing device, it is conceivable that the user interface control unit performs processing of displaying a list of all or part of communicable imaging devices according to processing of searching for an imaging device capable of wireless communication.

The imaging devices capable of wireless communication with the information processing device are searched for and all or part of the imaging devices are displayed in the list, or imaging devices corresponding to specific conditions, of the communicable imaging devices, are displayed in the list. The specific conditions are assumed to be a model, a manufacturer, and the like of the imaging device.

In the above-described information processing device, it is conceivable that the wireless communication is short-range wireless communication.

The short-range wireless communication in the present disclosure refers to wireless communication with a short communication distance. Specifically, standard communication such as Bluetooth (registered trademark), wireless fidelity (Wi-Fi: registered trademark), or near field communication (NFC: registered trademark), infrared communication, or information transmission using a QR code (registered trademark) corresponds to the short-range wireless communication.

In the above-described information processing device, it is conceivable that the user interface control unit performs processing of detecting an operation to select an imaging device to serve as a transfer destination of the FTP setting information, as an operation for the list displaying imaging devices.

That is, the user can select the imaging device to serve as a transfer destination on the list display of the information processing device.

In the above-described information processing device, it is conceivable that the user interface control unit performs processing of detecting an operation to select a plurality of imaging devices to serve as transfer destinations of the FTP setting information, as an operation for the list displaying imaging devices.

That is, the user can designate the imaging devices as the transfer destinations on the list display of the information processing device.

In the above-described information processing device, it is conceivable that the user interface control unit performs processing of displaying information regarding an FTP setting in an imaging device to serve as a transfer destination of the FTP setting information.

The information regarding the FTP setting information in the imaging device to serve as a transfer destination can be presented to and confirmed by the user.

In the above-described information processing device, it is conceivable that the user interface control unit performs processing of executing display of a registration frame of an FTP setting in the imaging device to serve as a transfer destination of the FTP setting information, and detecting an operation to select a registration frame to serve as a write destination of the FTP setting information.

The registration frame of the FTP setting information in the imaging device to serve as a transfer destination is presented to the user and enables the user to select the registration frame to serve as a write destination.

In the above-described information processing device, it is conceivable that the user interface control unit displays the registration frame of an FTP setting in the imaging device to serve as a transfer destination of the FTP setting information, with a setting name given to each registration frame.

There are some cases where the setting name input by the user is given to the registration frame of the FTP setting information in the imaging device to serve as a transfer destination, for example. The registration frame is displayed with such a setting name.

In the above-described information processing device, it is conceivable that the user interface control unit displays the registration frame of an FTP setting in the imaging device to serve as a transfer destination of the FTP setting information, with same information as information displayed in the imaging device.

In a case where the registration frame of the FTP setting information is displayed with, for example, a frame number and a frame name in the imaging device to serve as a transfer destination, the registration frame is also displayed with the frame number and the frame name in the information processing device 2.

It is conceivable that the above-described information processing device is a portable terminal device.

For example, the processing of the user interface control unit and the communication control unit is performed in a portable terminal device such as a smartphone or a tablet device.

In the above-described information processing device, it is conceivable to include an FTP setting management unit configured to edit FTP setting information acquired from the communicable imaging device according to an input in an input environment for editing the FTP setting information provided by the user interface control unit.

That is, the FTP setting information stored in the imaging device side can be imported and edited on the information processing device side.

In the above-described information processing device, it is conceivable that the communication control unit performs processing of transferring FTP setting information for causing the information processing device to serve as an FTP server to the imaging device.

For example, in a case where the imaging device uploads image data and the like to the information processing device, the information processing device serves as an FTP server. The FTP setting information in this case is transferred to the imaging device.

In the above-described information processing device, it is conceivable to perform processing of confirming availability of upload connection by the FTP setting information before executing transfer of the FTP setting information to the imaging device.

For example, before transferring the FTP setting information to the imaging device, whether or not the FTP setting information can be connected to a predetermined FTP server is confirmed.

The information processing method according to the present technology is an information processing method in which an information processing device executes user interface processing of presenting a communicable imaging device and enabling an operation to designate an imaging device to serve as a transfer destination, and communication control processing of executing transfer of FTP setting information to the imaging device designated by the user interface processing.

With the configuration, an environment in which FTP setting information can be easily registered in an imaging device is realized for the user.

The program according to the present technology is a program for causing an information processing device to execute processing corresponding to such an information processing method.

With the configuration, the transfer (reflection to imaging devices) of FTP setting information of the present disclosure can be executed by various types of information processing devices.

BRIEF DESCRIPTION OF DRAWINGS

FIG. 3 is an explanatory diagram of a display example of FTP settings in the imaging device according to the embodiment.

FIGS. 9A to 9E are explanatory diagrams of screen transition to an FTP upload setting screen according to the first embodiment.

FIGS. 10A to 10F are explanatory diagrams of screen transition regarding transfer of FTP setting information according to the first embodiment.

FIGS. 13A to 13C are explanatory diagrams of a write destination selection screen according to the first embodiment.

DESCRIPTION OF EMBODIMENTS

Hereinafter, an embodiment will be described in the following order.
<1. Transfer and Upload of FTP Setting Information According to First Embodiment>
<2. Configuration of Imaging Device>
<3. Configuration of Information Processing Device>
<4. User Interface Screen Transition>
<5. Processing Example of First Embodiment>
<6. Second Embodiment>
<7. Third Embodiment>
<8. Fourth Embodiment>
<9. Conclusion and Modification>

Note that, as terms used in the present disclosure, "transfer", "reflect", "upload", and "FTP setting information" are used as the following meanings.

"Transfer" means to transmit information from one device to another device, but in the present disclosure, transmitting FTP setting information from an information processing device 2 to an imaging device 1 is mainly referred to as "transfer".

"Reflect" means to register the FTP setting information received on the imaging device 1 side by the above-described "transfer". That is, "reflect" refers to a state where the user becomes able to upload images and the like using the transferred FTP setting information by the imaging device 1.

"Upload" means that a client device transmits image data and the like to an FTP server. In the case of the present disclosure, the imaging device 1 and an information processing device 2 to be described below may serve as client devices for an FTP server 4. Furthermore, the information processing device 2 may function as an FTP server and the imaging device 1 may function as a client device.

"FTP setting information" refers to an information group including various types of setting information as FPT settings.

Figure 1:
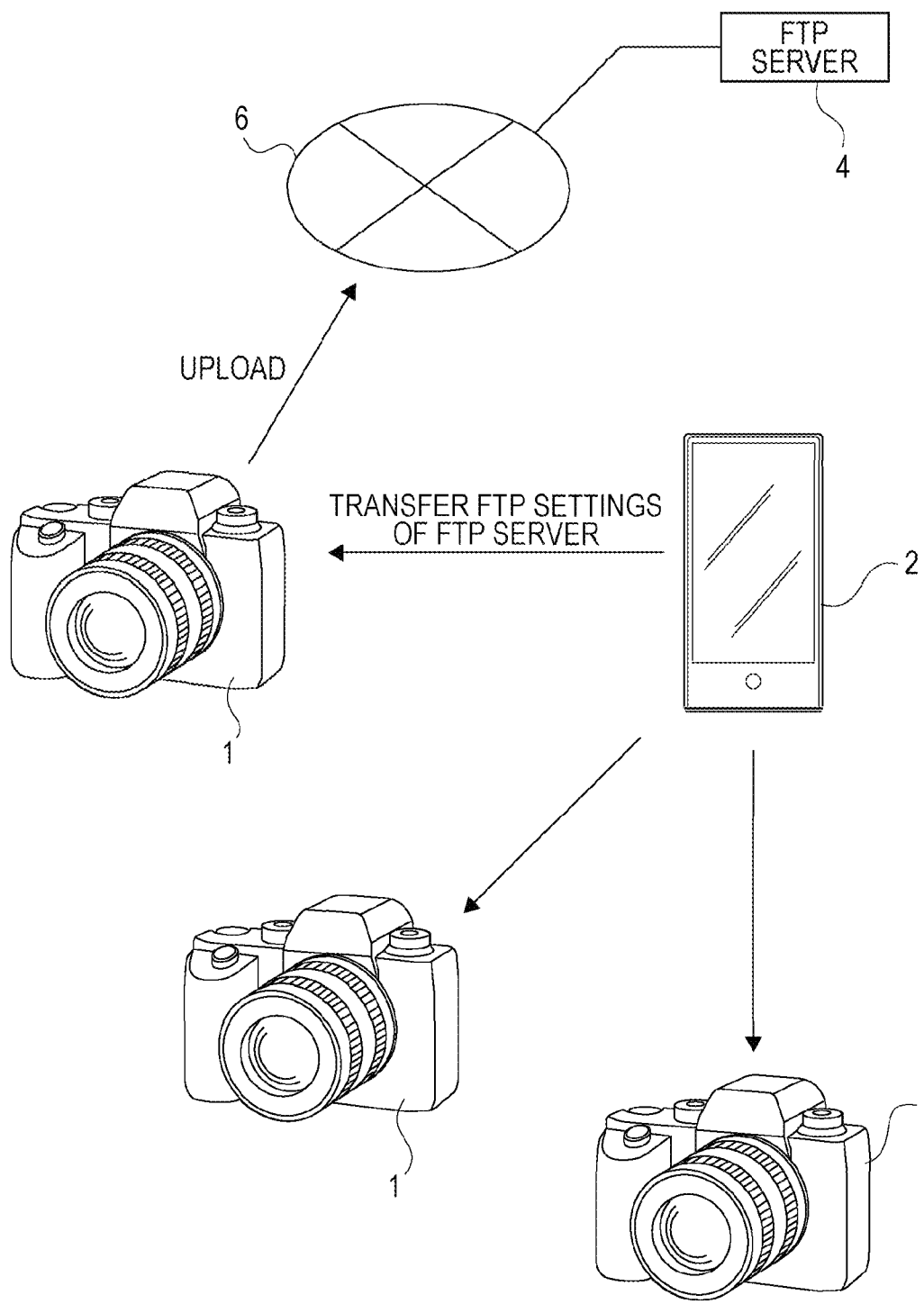
FIG. 1 is an explanatory diagram of transfer of FTP setting information and upload of an image according to a first embodiment of the present technology.

1. Transfer and Upload of FTP Setting Information According to First Embodiment FIG. 1 illustrates an imaging device 1, an information processing device 2, an FTP server 4, and a network 6.

As the imaging device 1, there are various imaging devices such as a video camera and a still camera. The illustrated imaging device 1 is assumed to be a camera used by a photographer or a journalist in a sport or event venue, a news gathering site, or the like. For example, one photographer may use one imaging device 1, but may use a plurality of imaging devices 1.

Note that, in the description, the imaging device 1 may be referred to as a "camera".

Here, as the information processing device 2, a portable terminal device such as a smart phone is exemplified.

Note that, as specific examples of the information processing device, various examples are assumed, including, for example, a personal computer device, a tablet-type information processing device, a mobile phone device, a game device, an audio device, a video device, a communication device, a television device, a server device, and the like. Any device capable of performing calculations as information processing, such as a device incorporating a microcomputer, can be realized as the information processing device of the present disclosure.

However, since use in an event venue or the like is assumed as described above, a portable terminal such as a smartphone or a tablet device is favorable.

The imaging device 1 and the information processing device 2 can mutually perform information communication by, for example, short-range wireless communication such as Bluetooth (registered trademark), Wi-Fi (registered trademark) communication, or near field communication (NFC), or infrared communication.

Note that the imaging device 1 and the information processing device 2 may be able to communicate with each other by wired connection communication.

Furthermore, it is conceivable that the information processing device 2 displays a QR code or the like, and the imaging device 1 reads the QR code to transfer information.

As the network 6, for example, the Internet, a home network, a local area network (LAN), a satellite communication network, or other various networks are assumed.

As the FTP server 4, for example, a server operated by a newspaper company, a broadcasting station, a communication company, or the like is conceivable. Of course, the FTP server 4 is not limited to such a server.

As a form of the FTP server 4, a cloud server, a home server, a personal computer, or the like is assumed.

The imaging device 1 can upload captured image data and the like to the FTP server 4 via the network 6.

In a case where a user of the imaging device 1 is a professional photographer working for a newspaper company, for example, a system usage mode in which the user instantly uploads images captured in an event venue from the imaging device 1 to the FTP server 4 is assumed.

For this purpose, FTP setting information for uploading information to the FTP server 4 needs to be registered in the imaging device 1.

In the present embodiment, the user creates FTP setting information in the information processing device 2, and the created FTP setting information can be transferred to and reflected in the imaging device 1.

As will be described below, content of the FTP setting information includes an FTP server host name, a saving destination path, a user name, a password, a connection type, and the like.

The user can create such FTP setting information by using the information processing device 2 that allows easy character input, and can transfer and reflect the FTP setting information in the imaging device 1. This facilitates preparation for uploading information from the imaging device 1 to the FTP server 4, that is, registration of the FTP setting information in the imaging device 1 for the user.

2. Configuration of Imaging Device

Figure 2:
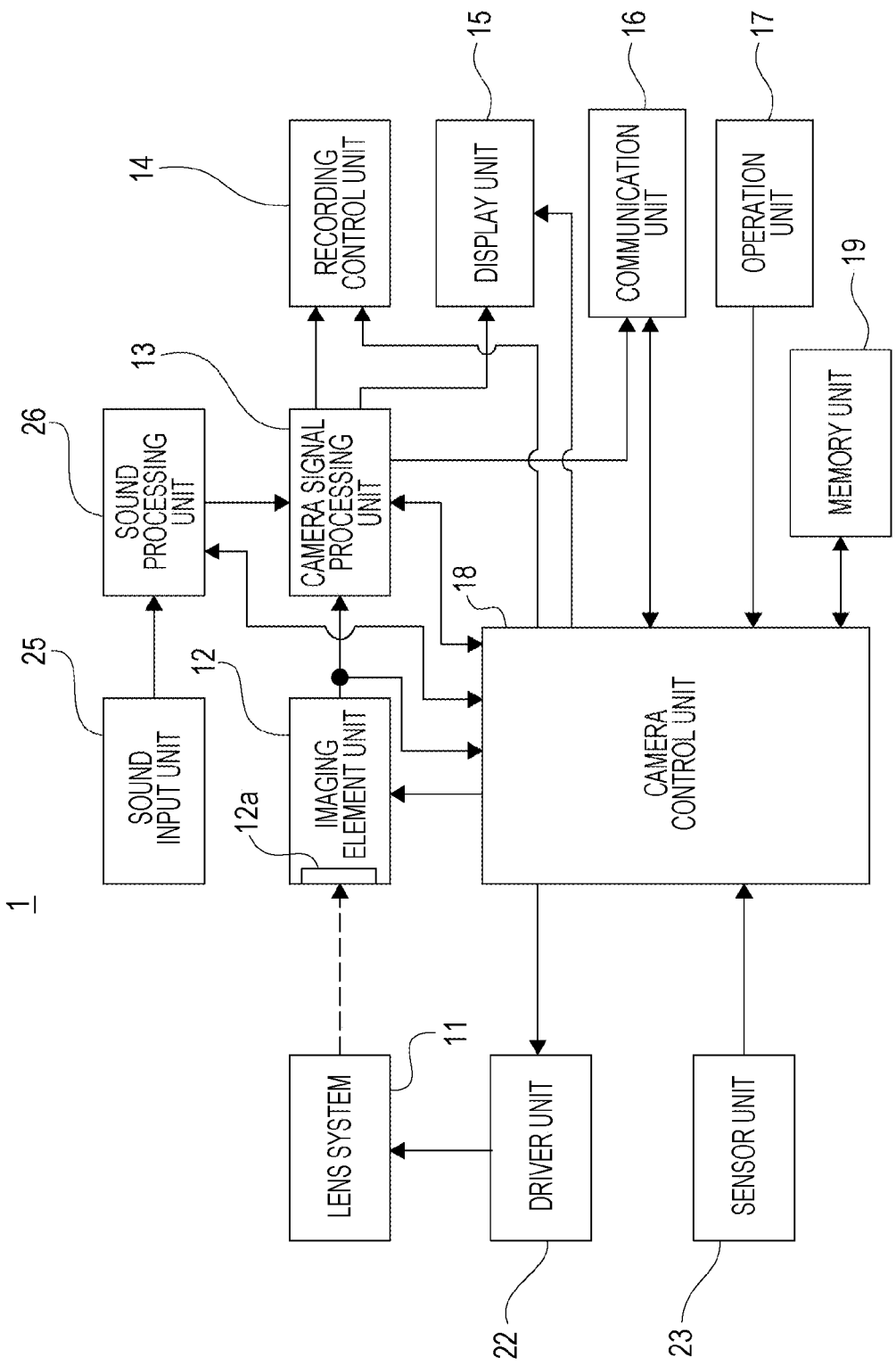
FIG. 2 is a block diagram of an imaging device that performs communication in the embodiment.

A configuration example of the imaging device 1 will be described with reference to FIG. 2.

The imaging device 1 includes, for example, a lens system 11, an imaging element unit 12, a camera signal processing unit 13, a recording control unit 14, a display unit 15, an output unit 16, an operation unit 17, a camera control unit 18, a memory unit 19, a driver unit 22, a sensor unit 23, a sound input unit 25, and a sound processing unit 26.

The lens system 11 includes lenses such as a zoom lens and a focus lens, an aperture mechanism, and the like. The lens system 11 guides light (incident light) from an object and collects the light in the imaging element unit 12.

The imaging element unit 12 includes, for example, a complementary metal oxide semiconductor (CMOS)-type or charge coupled device (CCD)-type image sensor (imaging element) 12a.

The imaging element unit 12 executes, for an electrical signal obtained by photoelectrically converting the light received by the image sensor 12a, correlated double sampling (CDS) processing, automatic gain control (AGC) processing, and the like and further performs analog/digital (A/D) conversion processing. Then, the imaging element unit 12 outputs an imaging signal as digital data to the camera signal processing unit 13 and the camera control unit 18 at a subsequent stage.

The camera signal processing unit 13 is configured as an image processing processor such as a digital signal processor (DSP). The camera signal processing unit 13 applies various types of signal processing to a digital signal (captured image signal) from the imaging element unit 12. For example, the camera signal processing unit 13 performs, as camera processes, preprocessing, synchronization processing, YC generation processing, resolution conversion processing, codec processing, and the like.

In the preprocessing, the camera signal processing unit 13 performs clamp processing of clamping R, G, and B black levels to a predetermined level, correction processing among R, G, and B color channels, and the like, for the captured image signal from the imaging element unit 12.

In the synchronization processing, the camera signal processing unit 13 applies color separation processing so that image data for each pixel has all of R, G, and B color components. For example, in a case of an image element using a Bayer color filter, demosaic processing is performed as the color separation processing.

In the YC generation processing, the camera signal processing unit 13 generates (separates) a luminance (Y) signal and a color (C) signal from R, G, and B image data.

In the resolution conversion processing, the camera signal processing unit 13 executes the resolution conversion processing for the image data to which various types of signal processing have been applied.

In the codec processing, the camera signal processing unit 13 performs, for example, encoding processing for recording or communication and file generation, for the image data to which various types of processing have been applied.

For example, as a still image file, a file in a format such as joint photographic experts group (JPEG), tagged image file format (TIFF), or graphics interchange format (GIF) is generated. Furthermore, it is conceivable to generate an image file as an MP4 format or the like used for recording video and sound conforming to MPEG-4. Note that it is also conceivable to generate an image file as raw image data.

The recording control unit 14 performs recording/reproduction with respect to a recording medium such as a nonvolatile memory. For example, the recording control unit 14 performs processing of recording image files and thumbnail images of moving image data and still image data, and the like on the recording medium.

Various actual forms of the recording control unit 14 are conceivable. For example, the recording control unit 14 may be configured as a flash memory and a write/read circuit thereof built in the imaging device 1. Furthermore, the recording control unit 14 may be configured as a form by a card recording/reproducing unit that performs recording/reproducing access to a recording medium attachable/detachable to/from the imaging device 1, for example, a memory card (portable flash memory or the like). Furthermore, the recording control unit 14 may be realized as a hard disk drive (HDD) or the like as a form incorporated in the imaging device 1.

The display unit 15 is a display unit that performs various displays for a capturer, and is a display panel or a viewfinder by a display device such as a liquid crystal display (LCD) or an organic electro-luminescence (EL) arranged in a housing of the imaging device 1.

The display unit 15 causes various displays to be executed on a display screen on the basis of an instruction from the camera control unit 18.

For example, the display unit 15 displays a reproduced image of the image data read from the recording medium by the recording control unit 14.

Furthermore, image data of a captured image converted in resolution for display by the camera signal processing unit 13 is supplied to the display unit 15, and the display unit 15 may perform display on the basis of the image data of the captured image according to the instruction from the camera control unit 18. As a result, a so-called through image (object monitoring image), which is a captured image during composition confirmation or moving image recording, is displayed.

Furthermore, the display unit 15 causes various operation menus, icons, messages, and the like, that is, display as a graphical user interface (GUI) to be executed on the screen on the basis of the instruction from the camera control unit 18.

The communication unit 16 performs data communication and network communication with an external device by way of wired or wireless means.

For example, the communication unit 16 transmits and outputs captured image data (a still image file or a moving image file) to an external display device, recording device, reproduction device, or the like.

Furthermore, the communication unit 16 can perform communication via various networks 6 such as the Internet, a home network, and a local area network (LAN), and transmit and receive various data to and from servers and terminals on the network, as a network communication unit, for example. For example, in the case of the present embodiment, the communication unit 16 performs communication processing of uploading captured image data (the above-described image files and the like) to the FTP server 4.

Furthermore, in the case of the present embodiment, the communication unit 16 has a function to mutually communicate with the information processing device 2 by the above-described short-range wireless communication such as Bluetooth, Wi-Fi, or NFC, infrared communication, wired connection communication, or the like.

The operation unit 17 collectively represents input devices for the user to perform various operation inputs. Specifically, the operation unit 17 represents various operators (keys, dials, touch panels, touch pads, and the like) provided on the housing of the imaging device 1.

A user operation is detected by the operation unit 17, and a signal corresponding to the input operation is sent to the camera control unit 18.

The camera control unit 18 is configured by a microcomputer (arithmetic processing unit) provided with a central processing unit (CPU).

The memory unit 19 stores information and the like used by the camera control unit 18 for processing. The illustrated memory unit 19 comprehensively represents a read only memory (ROM), a random access memory (RAM), a flash memory, and the like.

The memory unit 19 may be a memory area built in a microcomputer chip as the camera control unit 18, or may be configured by a separate memory chip.

The camera control unit 18 executes a program stored in the ROM, the flash memory, or the like of the memory unit 19, thereby controlling the entire imaging device 1.

For example, the camera control unit 18 controls operations of necessary parts for control of a shutter speed of the imaging element unit 12, instructions of various types of signal processing in the camera signal processing unit 13, the imaging operation and recording operation according to user operations, a reproduction operation of a recorded image file, operations of the lens system 11 such as zoom, focus, and aperture adjustment in a lens barrel, a user interface operation, and the like.

The RAM in the memory unit 19 is used for temporary storage of data, programs, and the like, as a work area for various data processing by the CPU of the camera control unit 18.

The ROM and the flash memory (nonvolatile memory) in the memory unit 19 are used to store an operating system (OS) for the CPU to control each unit, content files such as image files, an application program for various operations, firmware, various types of setting information, and the like.

Various types of setting information include the above-described FTP setting information, exposure settings, shutter speed settings, and mode settings as setting information regarding imaging operation, white balance settings, color settings, settings regarding image effects regarding as setting information regarding image processing, custom key settings and display settings as setting information regarding operability, and the like.

The driver unit 22 is provided with, for example, a motor driver for a zoom lens driving motor, a motor driver for a focus lens driving motor, a motor driver for a motor of an aperture mechanism, and the like.

These motor drivers apply a drive current to the corresponding driver according to the instruction from the camera control unit 18 to cause the driver to move the focus lens and the zoom lens, open and close aperture blades of the aperture mechanism, and the like.

The sensor unit 23 comprehensively represents various sensors mounted on the imaging device.

For example, an inertial measurement unit (IMU) is mounted as the sensor unit 23. The sensor unit 23 can detect angular velocity using a pitch, yaw, and roll triaxial angular velocity (gyro) sensor and can detect acceleration using an acceleration sensor, for example.

Furthermore, as the sensor unit 23, for example, a position information sensor, an illuminance sensor, or the like may be mounted.

The sound input unit 25 includes a microphone, a microphone amplifier, and the like, and outputs a sound signal obtained by collecting ambient sound.

The sound processing unit 26 performs processing of converting the sound signal obtained by the sound input unit 25 into a digital sound signal, AGC processing, sound quality processing, noise reduction processing, and the like for the sound signal. The sound data that has undergone these types of processing is output to the camera signal processing unit 13 and the camera control unit 18.

For example, sound data is processed as sound data accompanying a moving image by the camera control unit 18 at the time of capturing the moving image.

Furthermore, the sound data can be filed as a voice file in the camera signal processing unit 13 or the camera control unit 18, as sound data as so-called voice memo at the time of imaging. The voice file can be recorded on a recording medium in association with an image file by the recording control unit 14, or can be transmitted and output together with the image file from the communication unit 16.

Here, as the settings registered in the imaging device 1, there is the FTP setting information described above. Since the FTP setting information is necessary for each FTP server, it is assumed that a plurality of pieces of FTP setting information is registered in the imaging device 1, and the user selects FTP setting information to be applied at the time of uploading.

FIG. 3 illustrates an example of an FTP list screen 90 displayed on the display unit 15, for example. On the FTP list screen 90, a plurality of registration frames 91 is displayed. One piece of FTP setting information is associated with each of the registration frames. One piece of FTP setting information is an information group including an FTP server host name, saving destination path, user name, password, connection type, and the like.

For example, assuming that nine pieces of FTP setting information can be registered in the imaging device 1, nine registration frames 91 are displayed. In a case where the registration frames 91 is not able to be displayed on one screen, the registration frames 91 are displayed by scroll operation. A scroll bar 92 indicates a current scroll position.

In the present example, a frame number 94 and a setting name 95 are displayed in one registration frame 91. The frame number indicates, for example, a number of the nine registration frames 91, and is displayed as "server 1" or "server 2" in the present example. The setting name 95 is a name given by the user to each FTP setting information. For example, FIG. 3 illustrates the setting names 95 such as "ABC" and "DEFF".

By displaying the setting name 95, the user can easily discriminate which FTP server 4 corresponds to the FTP setting information registered in each registration frame 91.

3. Configuration of Information Processing Device

Figure 4:
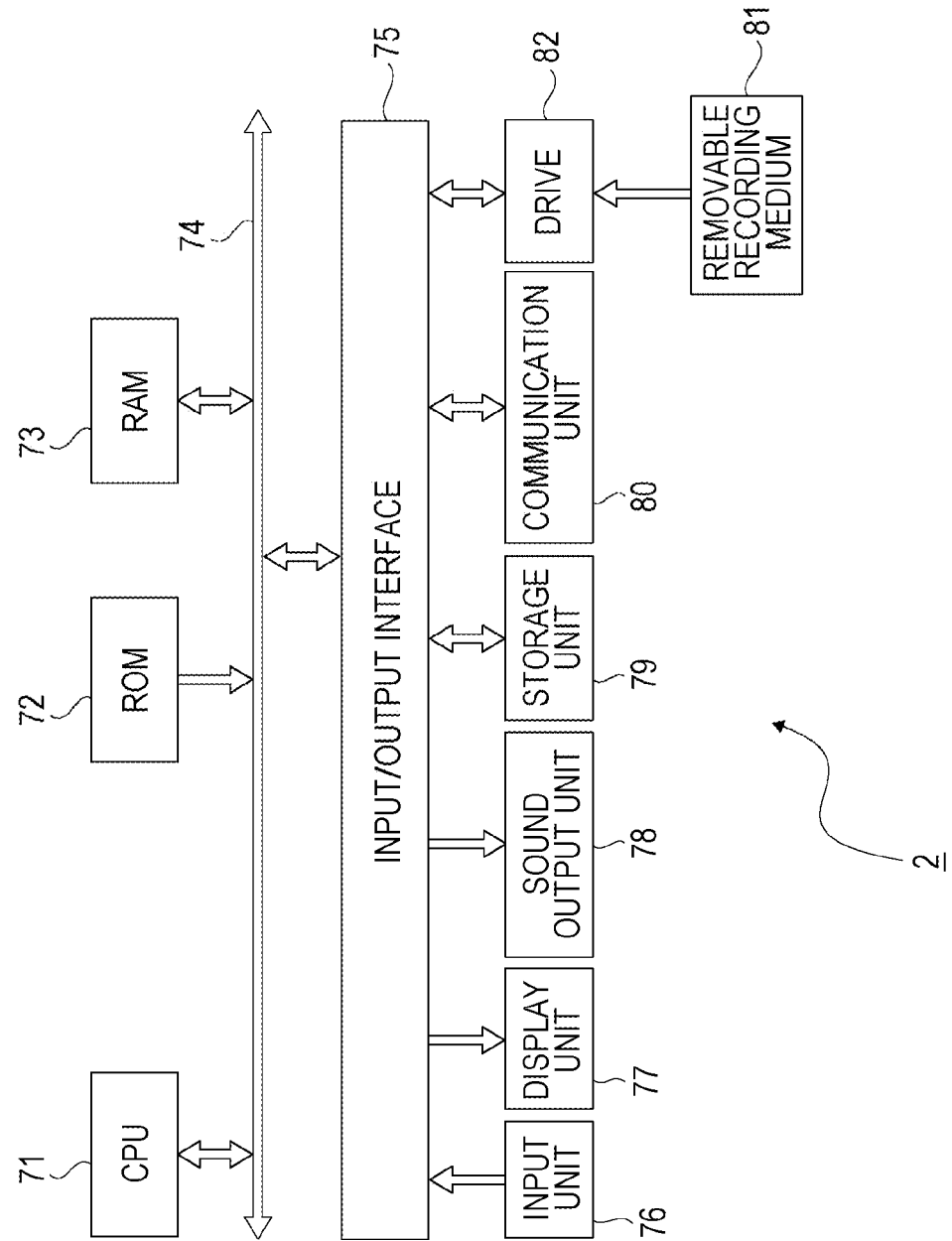
FIG. 4 is a block diagram of an information processing device according to the embodiment.

For example, FIG. 4 illustrates a configuration example of the information processing device 2 that is a portable terminal device or the like.

A CPU 71 of the information processing device 2 executes various types of processing according to a program stored in a ROM 72 or a program loaded from a storage unit 79 to a RAM 73. Furthermore, the RAM 73 appropriately stores data and the like necessary for the CPU 71 to execute the various types of processing.

The CPU 71, the ROM 72, and the RAM 73 are mutually connected via a bus 74. An input/output interface 75 is also connected to the bus 74.

An input unit 76 including operators and operation devices is connected to the input/output interface 75.

For example, as the input unit 76, various operators and operation devices such as a keyboard, a mouse, a key, a dial, a touch panel, a touch pad, and a remote controller are assumed.

A user operation is detected by the input unit 76, and a signal corresponding to the input operation is interpreted by the CPU 71.

Furthermore, a display unit 77 including an LCD or an organic EL panel and the like and a sound output unit 78 including a speaker and the like are connected to the input/output interface 75 integrally or as separate units.

The display unit 77 is a display unit that performs various displays, and includes, for example, a display device provided in the housing of the information processing device 2, a separate display device connected to the information processing device 2, or the like.

The display unit 77 executes displays of an image for various types of image processing, a moving image to be processed, and the like on the display screen on the basis of an instruction from the CPU 71. Furthermore, the display unit 77 performs display of various operation menus, icons, messages, and the like, that is, display as a graphical user interface (GUI), on the basis of the instruction from the CPU 71.

There are some cases where the storage unit 79 configured by a hard disk, a solid-state memory, and the like, a communication unit 80 configured by a modem and the like are connected to the input/output interface 75.

The communication unit 80 performs communication processing via a transmission path such as the Internet, and communication with various devices by wired/wireless communication, bus communication, or the like.

In the case of the present embodiment, the communication unit 80 has a function to communicate with the imaging device 1 by the above-described or short-range wireless communication such as Bluetooth, Wi-Fi, or NFC, infrared communication, wired connection communication, or the like.

Furthermore, a drive 82 is connected to the input/output interface 75, as necessary, and a removable recording medium 81 such as a magnetic disk, an optical disk, a magneto-optical disk, or a semiconductor memory is appropriately mounted to the drive 82.

Data files such as image files, various computer programs, and the like can be read by the drive 82 from the removable recording medium 81. The read data file is stored in the storage unit 79, and images and sounds included in the data file are output by the display unit 77 and the sound output unit 78. Furthermore, the computer program and the like read from the removable recording medium 81 are installed in the storage unit 79 as necessary.

The information processing device 2 can store the created FTP setting information and FTP setting information acquired from the outside in the storage unit 79 and the like.

Furthermore, the information processing device 2 can install software for processing of the present disclosure via network communication by the communication unit 80 or the removable recording medium 81. Alternatively, the software may be stored in advance in the ROM 72, the storage unit 79, or the like.

Figure 5:
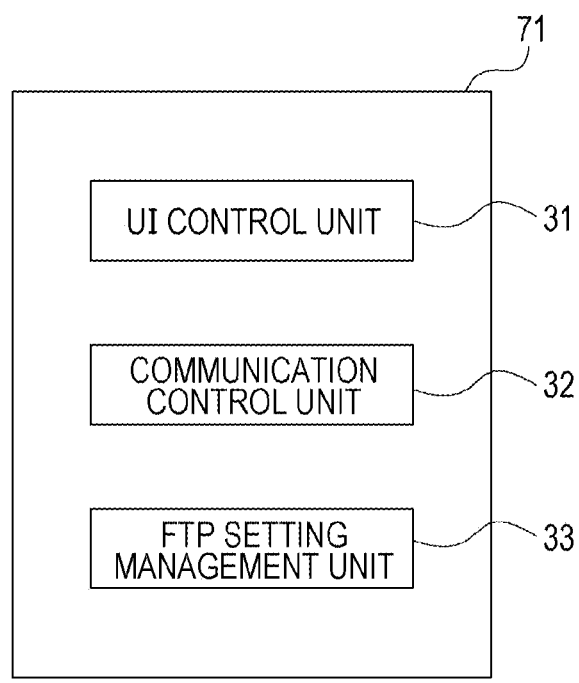
FIG. 5 is an explanatory diagram of a functional configuration of the information processing device according to the first embodiment.

For example, the functional configuration as illustrated in FIG. 5 is constructed in the CPU 71 of the information processing device 2 by such software (an application program).

FIG. 5 illustrates, as functions provided in the information processing device 2, a user interface (UI) control unit 31, a communication control unit 32, and an FTP setting management unit 33.

The UI control unit 31 performs user interface processing of presenting communicable imaging devices 1 and enabling an operation to designate an imaging device 1 to serve as a transfer destination.

Examples of the user interface processing include processing of providing the user with an operation input environment by performing outputs such as a display output and a sound output to the user, processing of performing a display output and a sound output for presenting various types of information to the user, processing of detecting operations by the user, and processing of detecting/estimating user intentions.

The UI control unit 31 performs the processing of providing the user with an operation input environment by performing outputs such as a display output and a sound output to the user, for example.

Alternatively, the UI control unit 31 performs the processing of detecting operations by the user, for example.

Alternatively, the UI control unit 31 performs both the processing of providing the user with an operation input environment and the processing of detecting operations by the user.

Of course, the UI control unit 31 may perform another user interface processing.

The communication control unit 32 is a function to control the communication operation by the communication unit 80.

The communication control unit 32 performs processing of causing the communication unit 80 to transfer the FTP setting information to the imaging device 1 designated by the UI processing.

By being provided with at least the UI control unit 31 and the communication control unit 32 described above, the information processing device 2 becomes a device capable of transferring the FTP setting information saved in, for example, the storage unit 79, to the imaging device 1 designated by the user.

The information processing device 2 desirably further has a function as the FTP setting management unit 33. The FTP setting management unit 33 is a function to create FTP setting information according to a user input operation using the input environment for creating FTP setting information, which is provided by the UI control unit 31.

By being provided with the FTP setting management unit 33, the information processing device 2 becomes a device capable of creating FTP setting information for an arbitrary FTP server 4.

The FTP setting management unit 33 may further edit the stored FTP setting information.

Each of the above functions is realized when, for example, the information processing device 2 installs application software for realizing the function to transfer the FTP setting information to the imaging device 1.

4. User Interface Screen Transition

Hereinafter, a UI screen on the display unit 77 of the information processing device 2 will be described. Each of the following screens is an example of screens displayed on the display unit 77 by the function of the UI control unit 31 by the CPU 71. In the description, for example, a smart phone is assumed as the information processing device 2, and display content on a display formed on the housing is assumed.

First, an example of newly creating FTP setting information in the information processing device 2 will be described.

Figure 6:
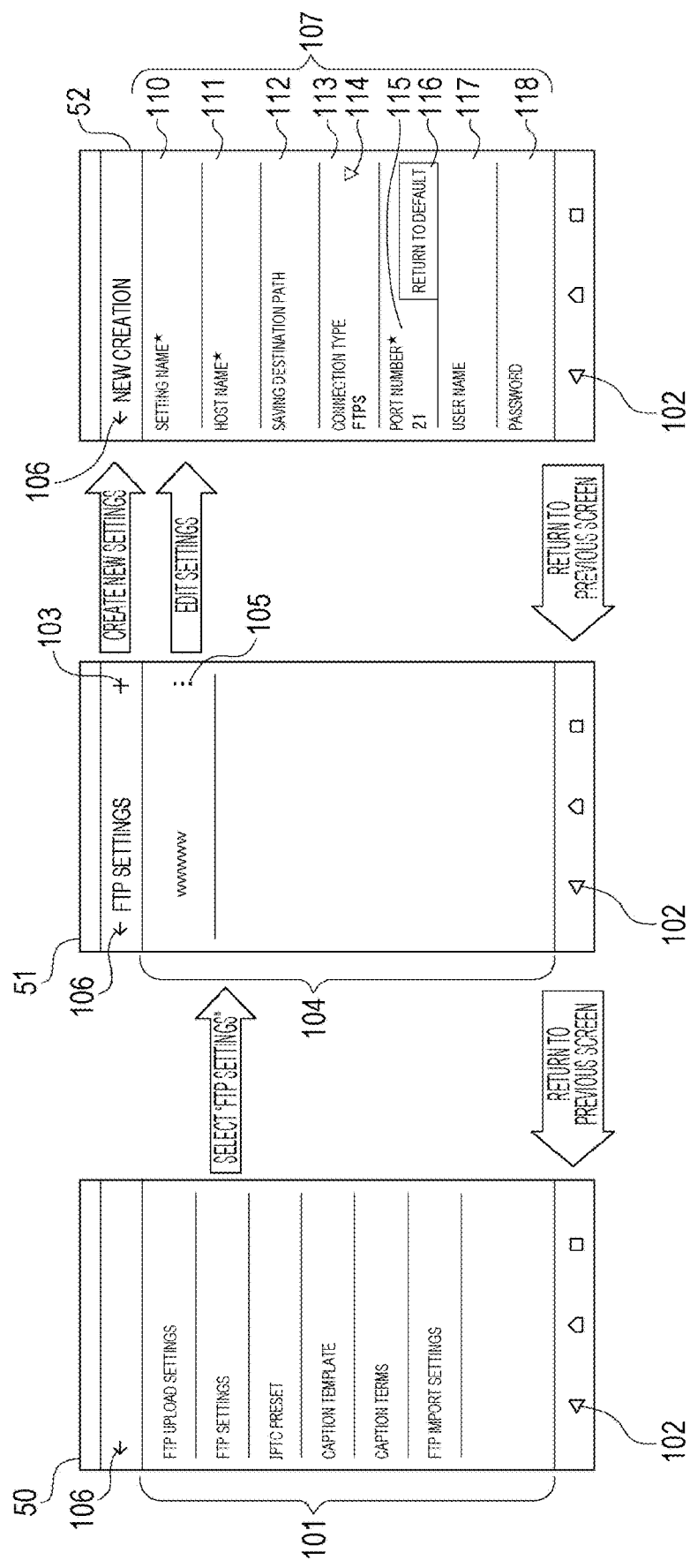
FIGS. 6A to 6C are explanatory diagrams of screen transition to a creation/editing screen according to the first embodiment.

FIGS. 6A to C illustrate screen transitions in a case of creating FTP setting information.

Note that each screen 50 is provided with a return button 106 for returning to a previous screen, a transition button 102 for transitioning to a predetermined state, and the like, which are appropriately operated by the user.

FIG. 6A illustrates a menu screen 50 including items regarding FTP setting information. A menu item area 101 is provided on the menu screen 50, and various items such as "FTP upload settings" and "FTP settings" are displayed.

When the user performs an operation to select "FTP setting" in the menu item area 101, the screen display transitions to an FTP setting screen 51 in FIG. 6B.

On the FTP setting screen 51, a new creation button 103 is provided. Furthermore, an FTP setting display area 104 is provided, and FTP setting information already stored in the information processing device 2 is displayed. Here, a state in which FTP setting information with a setting name of "wwwww" is stored is illustrated. An action bar 105 is displayed for the display of the stored FTP setting information.

On the FTP setting screen 51, when the user operates the new creation button 103, the display transitions to a creation/editing screen 52 in FIG. 6C.

On the creation/editing screen 52, input items regarding the FTP setting information in a setting information input area 107, and the user can input necessary matters.

FIG. 6C illustrates only part of the creation/editing screen 52. The entire creation/editing screen 52 is displayed by scrolling the screen.

Figure 7:
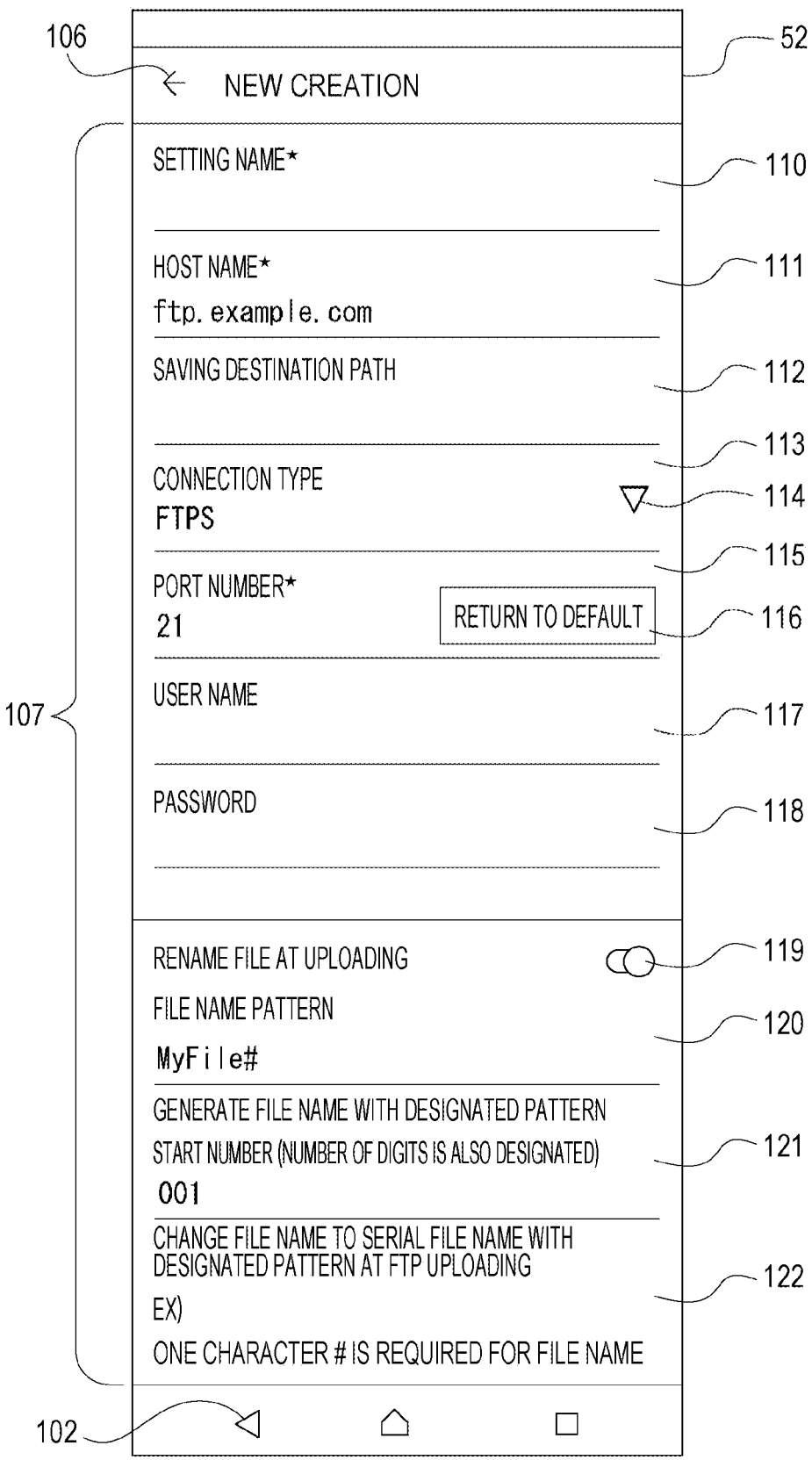
FIG. 7 is an explanatory diagram of the creation/editing screen according to the first embodiment.

FIG. 7 illustrates the entire creation/editing screen 52. The following fields are provided in the setting information input area 107 on the creation/editing screen 52.

In a setting name input field 110, a setting name assigned to the FTP setting information to be created can be input within a predetermined number of characters.

In a host name input field 111, the host name of the FTP setting information to be created, that is, the name assigned to the FTP server 4 can be input within a predetermined number of characters.

In a saving destination path input field 112, the host and a saving destination path of the FTP setting information can be input. For example, an IP address of the FTP server 4 and a path setting to a saving destination folder in the FTP server 4 are input.

In a connection type field 113, a connection type selected by the user among the connection types displayed as a list by an operation of a connection type pull-down button 114 is displayed.

In a port number input field 115, a port number can be input. The port number can be restored to a default value by an operation of a default restoration button 116.

In a user name input field 117, a user name can be input within a predetermined number of characters.

In a password input field 118, a password can be input within a predetermined number of characters.

A rename setting switch 119 is an operator for designating ON/OFF of a mode for renaming a file at the time of upload.

In a file name pattern input field 120, an arbitrary file name pattern for renaming can be input. In a start number input field 121, a start number can be input. In a case of renaming a file at the time of upload, a file name in which a sequential number from the start number is added to the file name pattern is used. In a rename setting sample display field 122, an example of the file name is displayed.

The user newly creates one piece of FTP setting information by inputting necessary items on the creation/editing screen 52.

For example, after inputting the necessary items, the user operates the transition button 102 or the return button 106 to return to the FTP setting screen in FIG. 6B, so that new creation of the one piece of FTP setting information is completed. The CPU 71 causes the storage unit 79 to store the one piece of FTP setting information based on the content input on the creation/editing screen 52.

In the FTP setting display area 104 on the FTP setting screen 51, the FTP setting information created in this way and stored in the information processing device 2 is displayed with, for example, the setting name ("wwwww" in FIG. 6B).

Figure 8:
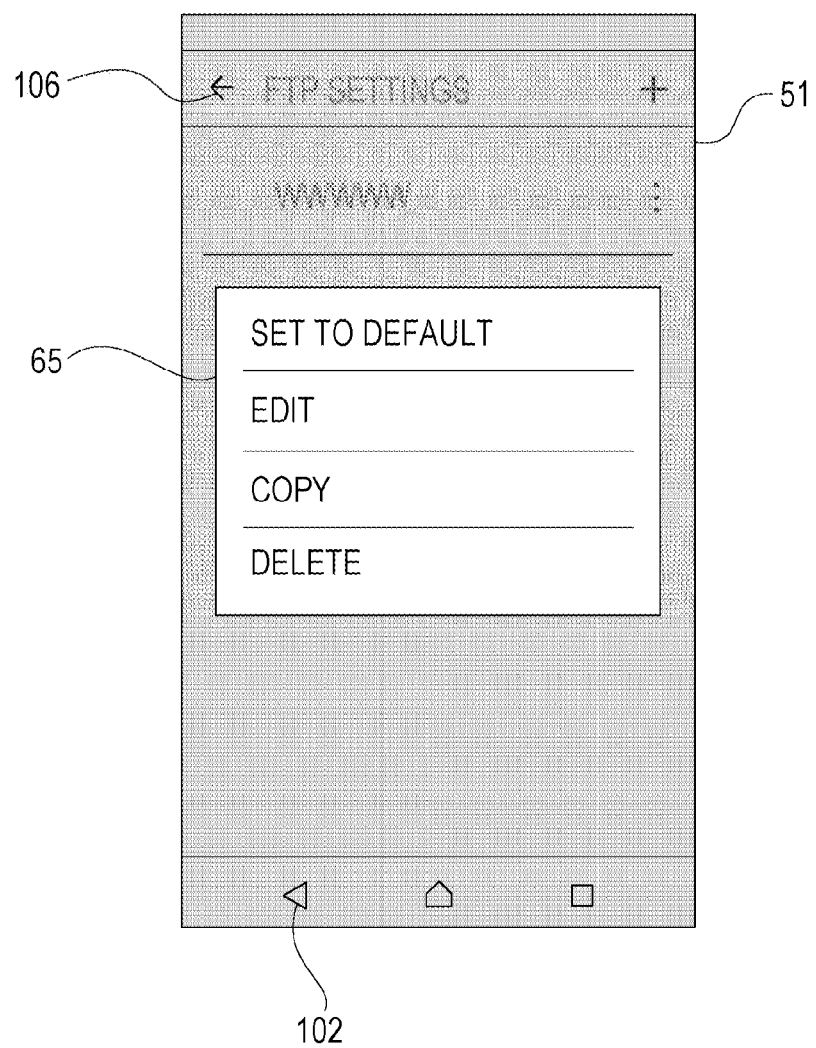
FIG. 8 is an explanatory diagram of a processing selection dialog according to the first embodiment.

In a case where the user operates the action bar 105 for the FTP setting information displayed in the FTP setting display area 104, a processing selection dialog 65 for selecting processing for the FTP setting information is displayed, as illustrated in FIG. 8, and for example, "set to default", "edit", "copy", "delete", and the like become selectable.

In a case where the user has selected "set to default" on the processing selection dialog 65, the CPU 71 sets the content of the FTP setting information to a default value on the creation/editing screen 52. In a case where the CPU 71 proceeds to the creation/editing screen 52 in FIG. 6C by the new creation button 103, for example, the content of the FTP setting information is input in the fields in the setting information input area 107 as default values.

In a case where the user has selected "edit" on the processing selection dialog 65, the CPU 71 causes the display to transition to the creation/editing screen 52 in FIG. 6C and enables editing of the FTP setting information. Note that, FIG. 6C illustrates an example in which "new settings" is displayed on the creation/editing screen 52. In a case where the display transitions to the creation/editing screen 52 by "edit" in this way, "edit settings" or the like is displayed instead of the characters of "new settings". Furthermore, in each field in the setting information input area 107 in this case, current content of the FTP setting information to be edited is displayed. The user can change the setting content by performing an input to or operating each field.

When the user operates the transition button 102 or the return button 106 after performing an input for editing, for example, the display returns to the FTP setting screen in FIG. 6B, and the content of the FTP setting information to be edited is updated. The CPU 71 rewrites the storage unit 79 to update the content of the FTP setting information to be edited according to the content input on the creation/editing screen 52.

In a case where the user has selected "copy" on the processing selection dialog 65, the CPU 71 creates another FTP setting information as a copy of the FTP setting information. That is, the CPU 71 creates FTP setting information having the same content as the FTP setting information for which an instruction on copy has been given, and causes the storage unit 79 to store the created FTP setting information as new FTP setting information.

The copied FTP setting information is also displayed in the FTP setting display area 104 on the FTP setting screen 51. Therefore, the user can easily create FTP setting information having content different from the copy source by operating the action bar 105 to display the processing selection dialog 65 and performing the above-described editing, for the copied FTP setting information, for example.

In a case where the user has selected "delete" in the processing selection dialog 65, the CPU 71 performs processing of deleting the FTP setting information. That is, the CPU 71 deletes the FTP setting information stored in the storage unit 79.

The user can arbitrarily create and edit FTP setting information in the information processing device 2 by the user interface accompanied by the screen transition as described above.

The FTP setting information thus created or edited can be transferred to and reflected in the imaging device 1.

Screen transitions to transfer the FTP setting information to the imaging device 1 will be described with reference to FIGS. 9A to 9E and 10A to 10F.

FIG. 9A illustrates a top screen 53 of when the information processing device 2 has activated application software for realizing the FTP setting information transfer function.

On the top screen 53, for example, thumbnails of images uploaded from the imaging device 1 and an FTP upload history are displayed in a main area 100.

The top screen 53 transitions to the menu screen 50 in FIG. 9B by a predetermined operation (see FIG. 6A). As described above, the item "FTP upload settings" is provided in the menu item area 101 on the menu screen 50. When this item is selected by the user, the screen transitions to an FTP upload setting screen 54 in FIG. 9C.

The FTP upload setting screen 54 is provided with a transfer target designation area 108, and FTP setting information to be transferred to the imaging device 1 is designated in the transfer target designation area 108.

In FIG. 9C, no FTP setting information is displayed in the transfer target designation area 108. A new creation button 109 is prepared on the FTP upload setting screen 54, and when the user operates the new creation button 109, the screen transitions to the creation/editing screen 52 (see FIGS. 6C and 7) in FIG. 9D. Thereby, the user can newly create the FTP setting information to be transferred to the imaging device 1.

When the user operates the transition button 102 or the return button 106, for example, after inputting the necessary items on the creation/editing screen 52, the screen returns to the FTP upload setting screen 54, as illustrated in FIG. 9E. At this time, the CPU 71 causes the storage unit 79 to store one piece of FTP setting information according to the content input on the creation/editing screen 52, and displays the name of the FTP setting information in the transfer target designation area 108 on the FTP upload setting screen 54. For example, FIG. 9E illustrates an example in which the FTP setting information named "aaa" has been created and displayed in the transfer target designation area 108. An action bar 126 is prepared corresponding to the FTP setting information.

Note that, in the present example, no FTP setting information is displayed at the stage of FIG. 9C, which can be considered as a case where no FTP setting information is stored in the information processing device 2.

In a case where one or more pieces of FTP setting information have already been stored in the storage unit 79 by the above-described creation or editing of the FTP setting information, the one or more pieces of FTP setting information are only required to be displayed in the transfer target designation area 108 as a list at the stage of FIG. 9C.

The user can select one piece of FTP setting information from among the displayed pieces in the transfer target designation area 108 and perform the operation to transfer the selected piece to the imaging device 1.

Screen transitions from the FTP upload setting screen 54 when one piece of FTP setting information is selected as a transfer target will be described with reference to FIGS. 10A to 10F.

FIG. 10A illustrates the FTP upload setting screen 54. Here, a state in which three pieces of FTP setting information "aaa", "bbb", and "ccc" are displayed in the transfer target designation area 108 on the FTP upload setting screen 54 is illustrated.

In a case of transferring the FTP setting information "aaa", the user operates the action bar 126 for "aaa".

Figure 11:
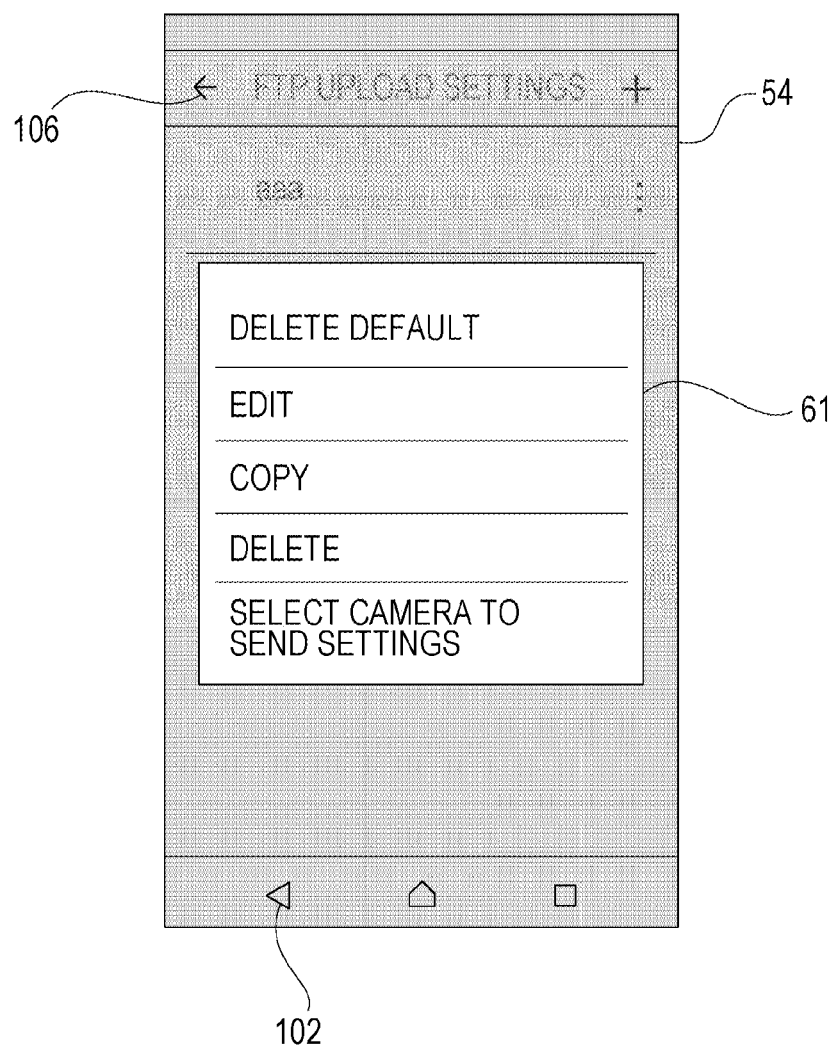
FIG. 11 is an explanatory diagram of a registered FTP setting dialog according to the first embodiment.

When the action bar 126 for certain FTP setting information has been operated by the user, a registered FTP setting dialog 61 for the FTP setting information is displayed as in FIG. 10B. FIG. 11 illustrates an enlarged state in which the registered FTP setting dialog 61 is displayed.

On the registered FTP setting dialog 61, items such as "delete default", "edit", "copy", "delete", "select camera to send settings", and the like are selectable.

"Delete default" refers to processing of deleting the above-described default on the creation/editing screen 52, and "edit", "copy", and "delete" are items for selecting processing similar to the above-described processing selection dialog 65.

In a case of transferring the FTP setting information to the imaging device 1, the user performs an operation to select the item "select camera to send settings".

Figure 12A:
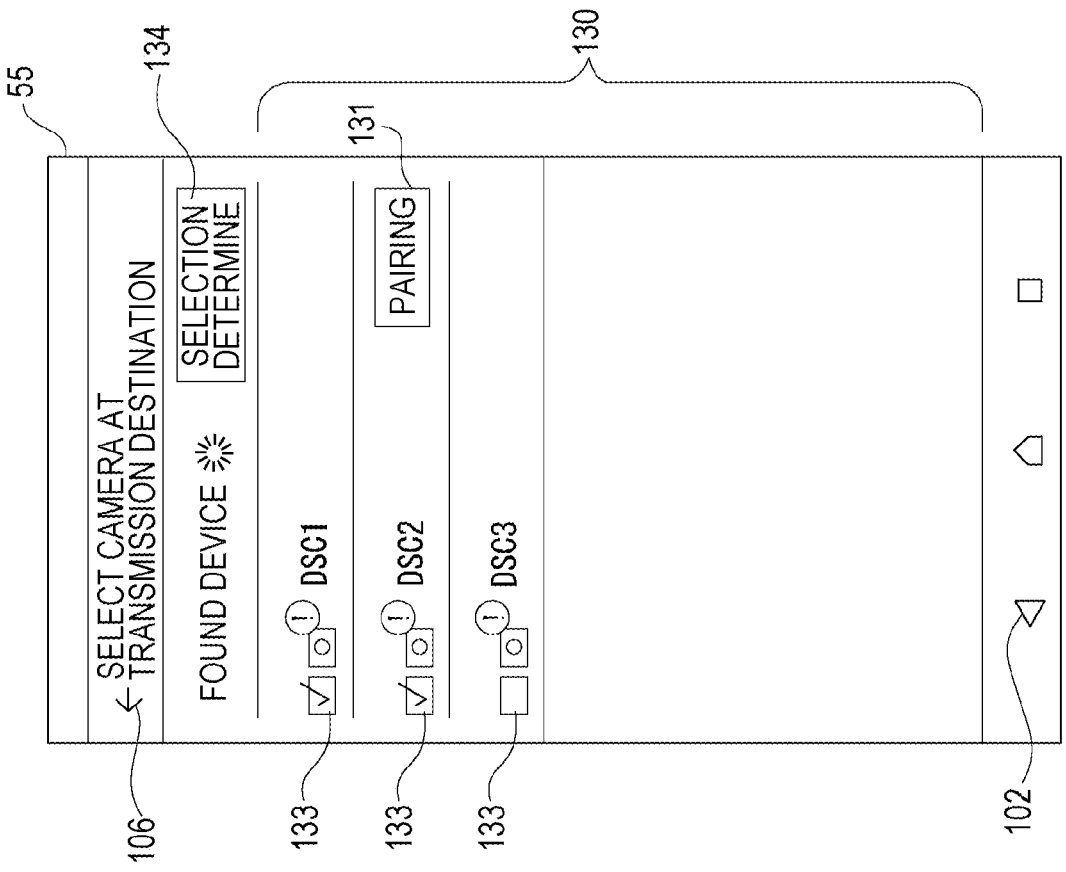
FIGS. 12A and 12B are explanatory diagrams of a camera setting screen according to the first embodiment.

When the operation has been performed, the screen transitions to a camera selection screen 55 in FIG. 10C. FIG. 12A illustrates the enlarged camera selection screen 55. On the camera selection screen 55, a camera list area 130 is provided, and communicable imaging devices 1 are displayed as a list.

Hereinafter, assume that the information processing device 2 and the imaging device 1 perform Bluetooth communication and transfer setting information.

In this case, the CPU 71 of the information processing device 2 scans Bluetooth communication-compatible devices as imaging devices 1 existing in the vicinity, and a found communicable imaging device 1 is displayed in the camera list area 130.

Note that, in this case, it is favorable to display only devices meeting predetermined conditions instead of displaying all the Bluetooth communication-compatible peripheral devices. For example, by setting a condition of being a camera, devices other than cameras are excluded.

Furthermore, the condition may be cameras of a specific manufacturer, cameras of a specific model, or the like, rather than simply a camera.

Such a condition is a condition for causing the camera list area 130 to display only the imaging devices 1 that can reflect the FTP setting information to be transferred. By excluding devices that do not make sense to transfer the FTP setting information or devices that is not able to reflect the FTP setting information even if transferred from the list, the user can be prevented from making useless selections and the usability is improved.

In the camera list area 130, imaging devices 1 are displayed as a list, as illustrated in FIG. 12A, under the condition of cameras of a specific manufacturer, for example. Here, an example of displaying the imaging devices 1 with camera names "DSC1", "DSC2", and "DSC3" as a list.

In this case, a pairing label 131 is displayed for the imaging device 1 that has not been paired with Bluetooth communication and is pairable.

The user performs an operation to select one imaging device 1 to which the FTP setting information is to be transferred, from among the imaging devices 1 displayed in the camera list area 130.

For example, when the user taps the area of the name "DSC2" of the imaging device 1, the imaging device 1 "DSC2" is selected as a transfer destination.

Figure 12B:
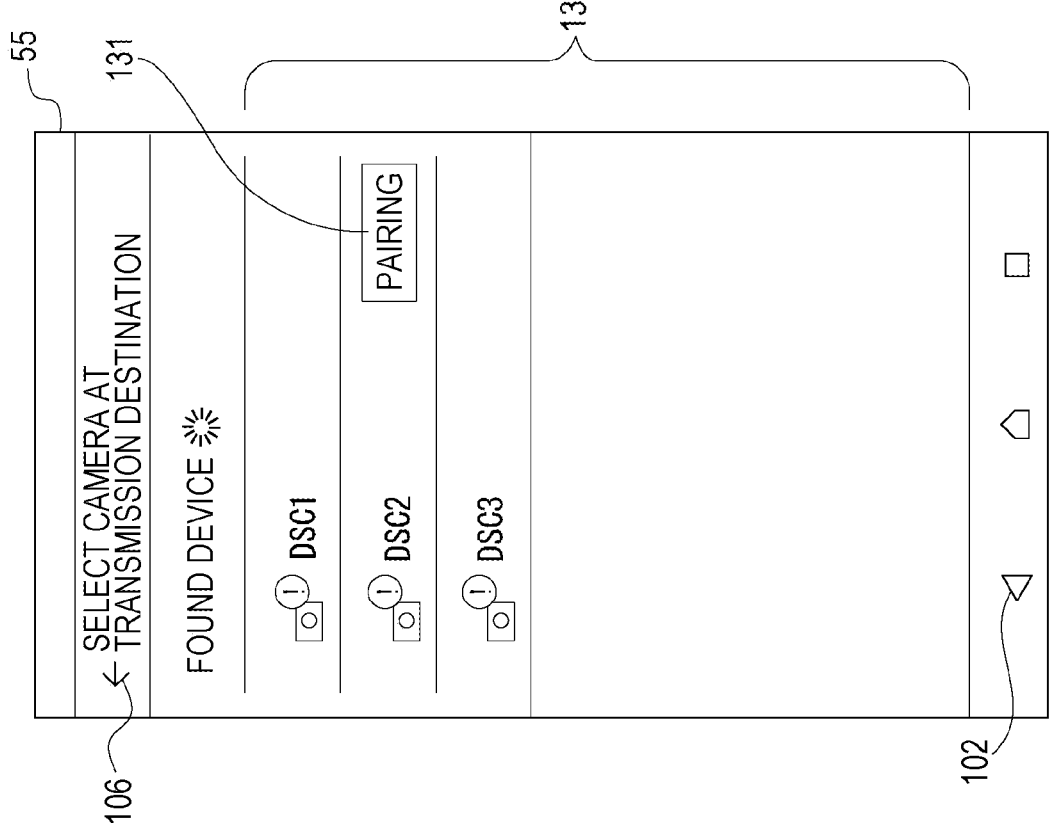

Note that, hereinafter, an example of selecting one imaging device 1 and transferring information will be described. However, the user may be able to select a plurality of imaging devices 1 to transfer information to the plurality of imaging devices 1. For example, as illustrated in FIG. 12B, check boxes 133 are prepared corresponding to the camera names, and the user can check the boxes by a tap operation or the like. Then, the user operates a selection determination button 134 with one or a plurality of checked camera names, thereby selecting the one or a plurality of imaging devices 1 as transfer destinations.

Such a multiple selection case will be described below. Here, the case of selecting only one imaging device 1 on the camera selection screen 55 as in FIG. 12A will be described.

When the user performs an operation to select one imaging device 1 on the camera selection screen 55, the screen transitions to a write destination selection screen 56 in FIG. 10D.

FIG. 13A illustrates the enlarged write destination selection screen 56.

On the write destination selection screen 56, a registration frame display area 140 is prepared, and the registration frames of the FTP setting information in the imaging device 1 selected as the transfer destination is displayed.

FIG. 3 has illustrated an example of the FTP list screen 90 displayed in the display unit 15 of the imaging device 1. In the registration frame display area 140, the registration frames are displayed with the setting names of the FTP settings displayed on the FTP list screen 90 of the imaging device 1 on the transfer destination.

For example, the registration frames are displayed with the setting names "ABC", "DEFF", and the like, as illustrated in FIG. 13A, in contrast with the imaging device 1 in the example in FIG. 3. In FIG. 3, for example, nine registration frames have been provided in the imaging device 1, whereas on the write destination selection screen 56, all the registration frames are displayable by scrolling. A scroll bar 141 indicates a current screen position.

In the registration frame display area 140, the user selects a registration frame to which the FTP setting information is to be written, which will be transferred later.

Since each registration frame is displayed with the setting name set by the user, the user can easily select a write destination and can be prevented from making a mistake.

FIG. 13B illustrates another example of the write destination selection screen 56. The another example is an example in which the display example of the registration frame display area 140 has the same content with the FTP list screen 90 of the imaging device 1 in FIG. 3. That is, the registration frames are displayed as "server 1", "server 2", and the like, and setting names 95 such as "ABC" and "DEFF" are displayed.

By making the content same as the display content on the imaging device 1 side, the user can easily determine and select the write destination.

However, as illustrated in FIG. 13C, the registration frame display area 140 may simply display distinguishable registration frames such as "FTP setting 1" and "FTP setting 2" without displaying the setting names and the like registered on the imaging device 1 side.

In a case of acquiring only information of the number of registered frames from the imaging device 1 selected as the transfer destination, such a display is conceivable.

In the registration frame display area 140 as in the above each example, the user performs a write destination selection operation such as tapping an arbitrary registration frame.

Figure 14A:
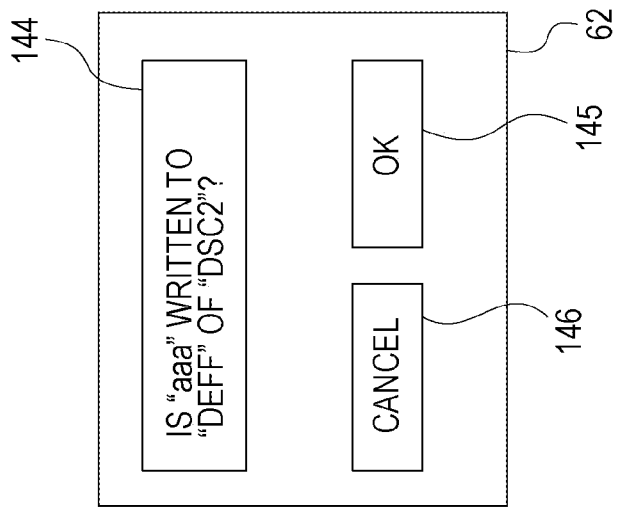
FIGS. 14A to 14C are explanatory diagrams of dialog display according to the first embodiment.

When the operation to select a registration frame is performed, a confirmation dialog 62 is displayed on the screen as illustrated in FIG. 10E. FIG. 14A illustrates the enlarged confirmation dialog 62. On the confirmation dialog 62, a message 144, an OK button 145, and a cancel button 146 are displayed.

Up to this point, for example, assume that the user has selected "DSC2" on the camera selection screen 55 in FIG. 10C, and the registration frame for the imaging device 1 with "DSC2" has been displayed in the registration frame display area 140 on the write destination selection screen 56 in FIG. 10D. Then, assume that the user has selected the registration frame "DEFF". In this case, a confirmation message such as "Is "aaa" written to "DEFF" of "DSC2"?" is displayed as the message 144. That is, the message 144 confirms the FTP setting information "aaa" is to be written to the registration frame "DEFF" of the imaging device "DSC2".

The user can operate the OK button 145 or the cancel button 146. When the user operates the cancel button 146, the screen returns to the write destination selection screen 56.

When the user operates the OK button 145, transfer of the FTP setting information is executed. Then, a completion dialog 63 is displayed as in FIG. 10F on the completion of the transfer.

Figure 14B:
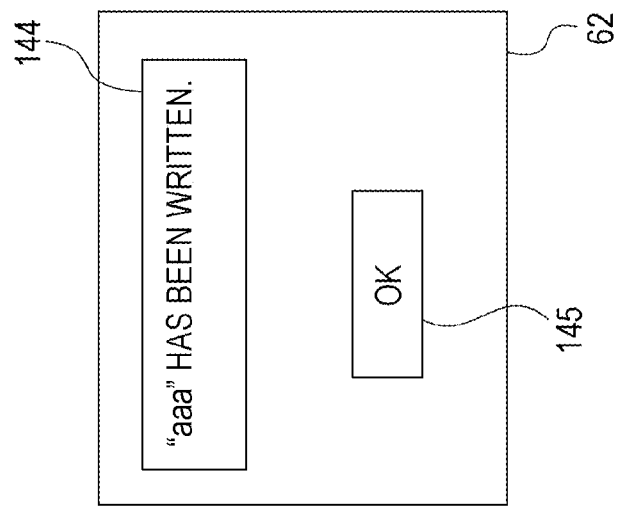

FIG. 14B illustrates the enlarged completion dialog 63. For example, ""aaa" has been written" is displayed as the message 144, presenting transfer completion to the user. Then, the OK button 145 is prepared, and when the user operates the OK button 145, the screen returns to the FTP upload setting screen 54 in FIG. 10A.

Figure 14C:
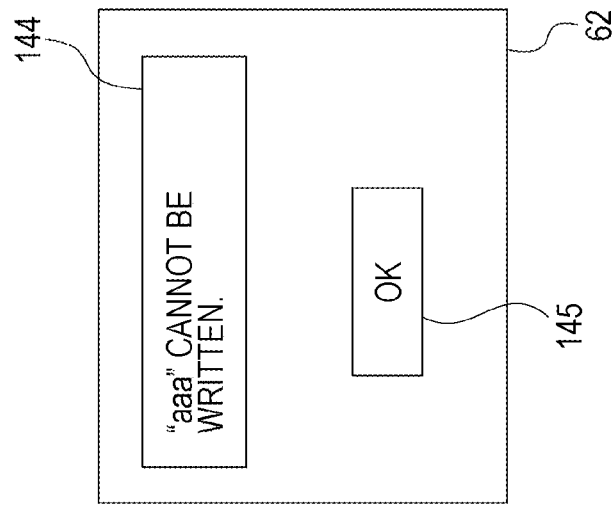

Note that, in a case where transfer of the FTP setting information has not been able to be normally completed for some reason, an error dialog 64 as illustrated in FIG. 14C is displayed. For example, the message 144 ""aaa" is not able to be written" is displayed to notify the user of a transfer error. Then, the OK button 145 is prepared, and when the user operates the OK button 145, the screen returns to the camera selection screen 55 in FIG. 10C.

5. Processing Example of First Embodiment

A processing example of transferring the FTP setting information performed on the above user interface will be described. Note that the processing example to be described below is processing performed by the functions of the UI control unit 31 and the communication control unit 32 described in FIG. 5, which are realized by the application software, in the CPU 71. Note that, assume that the FTP setting information to be transferred has been created by the function of the FTP setting management unit 33.

Figure 15:
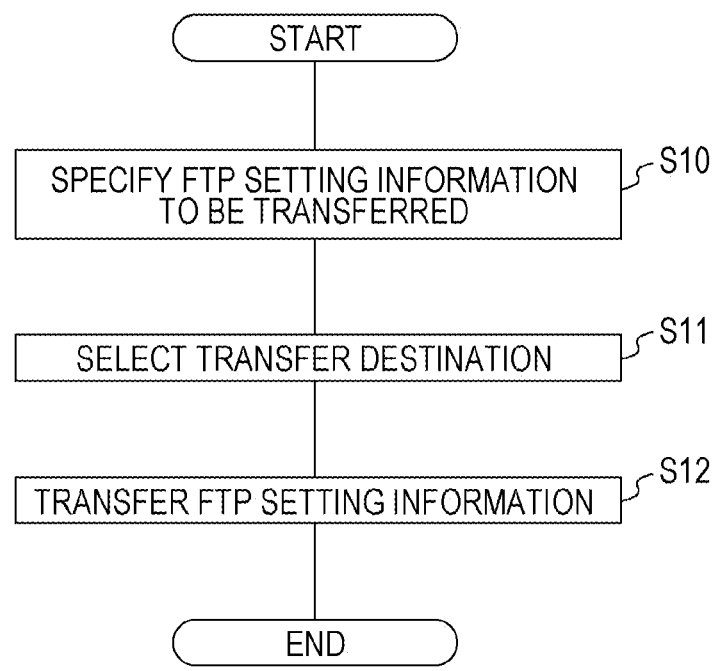
FIG. 15 is a flowchart of transfer processing for the FTP setting information to one imaging device according to the first embodiment.

FIG. 15 illustrates a processing example by the CPU 71.

In step S10, the CPU 71 performs processing of specifying the FTP setting information to be transferred. This is processing of specifying a certain piece of FTP setting information as a transfer target, from among the FTP setting information displayed on the FTP upload setting screen 54 by the UI control unit 31.

Specifically, for a certain piece of FTP setting information, the registered FTP setting dialog 61 is displayed by the operation of the action bar 126, and an item of camera selection of the transfer destination is selected, so that the FTP setting information to be transferred is specified.

In step S11, the CPU 71 performs processing of selecting the transfer destination. The selection of the transfer destination is the selection of the imaging device 1 on the transfer destination, and the selection of the registration frame in the imaging device 1.

This is processing after the UI control unit 31 causes the screen to transition to the camera selection screen 55 in FIG. 10C via the FTP upload setting screen 54 in FIG. 10A and the registered FTP setting dialog 61 in FIG. 10B, according to the user operation.

The CPU 71 determines a specific imaging device 1 as the transfer destination according to the user's selection operation on the camera selection screen 55. Furthermore, the CPU 71 displays the write destination selection screen 56 in FIG. 10D, for the imaging device 1 specified as the transfer destination by the UI control unit 31, and performs processing of specifying the registration frame as the write destination according to the user operation.

In step S12, the CPU 71 performs processing of transferring the FTP setting information specified in step S10 to the transfer destination selected in step S11 by the function of the communication control unit 32.

As a result, the FTP setting information has been transferred to the imaging device 1.

Figure 16:
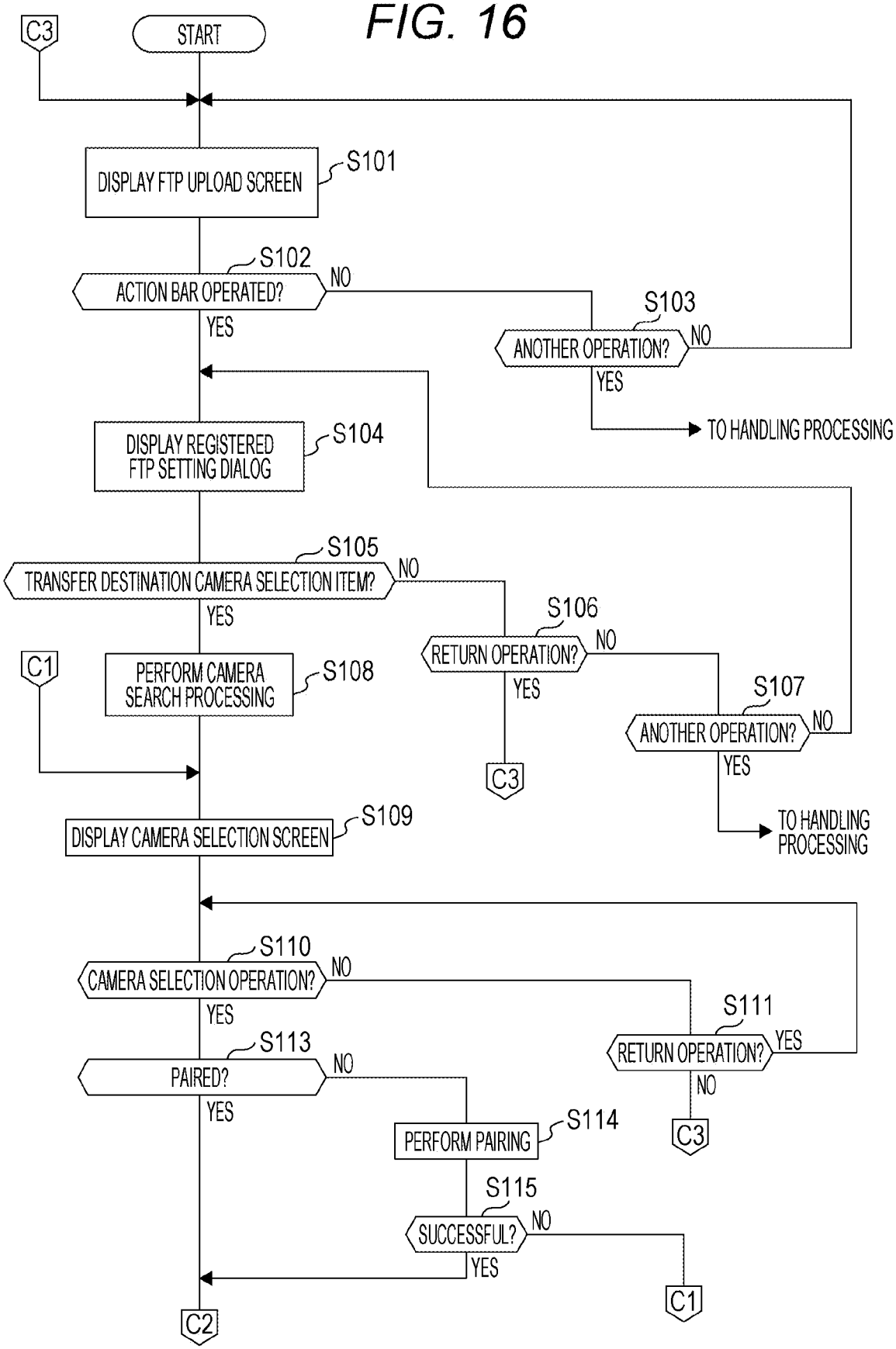
FIG. 16 is a flowchart of transfer processing for the FTP setting information according to the first embodiment.
Figure 17:
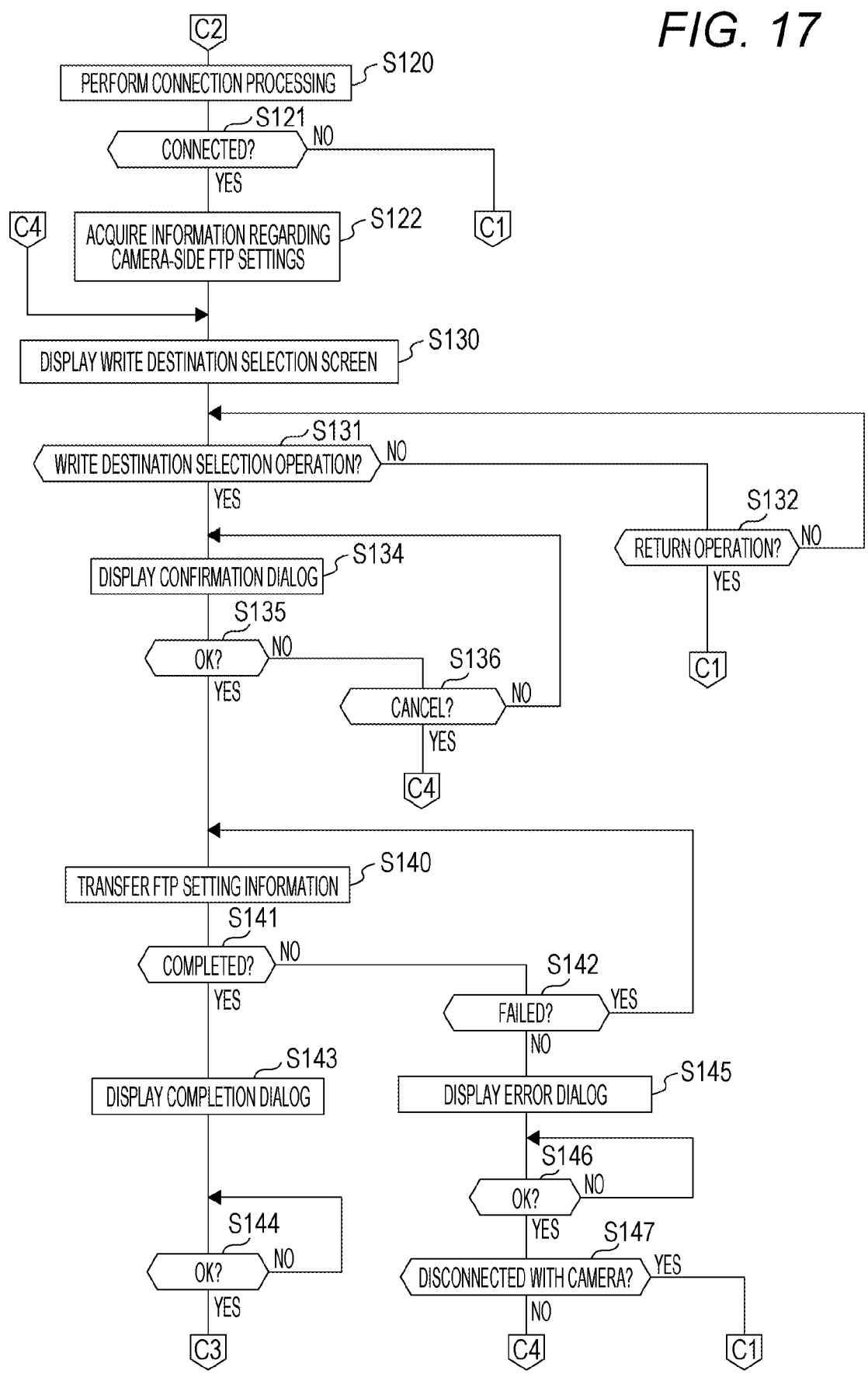
FIG. 17 is a flowchart of the transfer processing for the FTP setting information according to the first embodiment.

FIGS. 16 and 17 illustrate a more detailed example of the processing in FIG. 15. Note that FIGS. 16 and 17 illustrate a series of flowcharts separately, and "c1", "c2", "c3", and "c4" indicate connection relationships.

Note that FIGS. 16 and 17 illustrate processing examples from the state where the FTP upload setting screen 54 has been displayed.

In step S101, the CPU 71 causes the display unit 77 to display the FTP upload setting screen 54 as in FIG. 10A, for example. Then, the CPU 71 stands by for a user's operation. FIG. 16 illustrates that the CPU 71 confirms the operation of the action bar 126 in step S102 and monitors other operations in step S103.

Note that the other operations in this case include the operation to return the screen, the operation of the new creation button 109, and the like, and detailed description of these operations is omitted. The CPU 71 performs processing according to each operation.

When detecting an operation of the action bar 126 for a certain piece of the FTP setting information displayed in the transfer target designation area 108 on the FTP upload setting screen 54, the CPU 71 advances the processing from step S102 to step S104 and performs processing of displaying the registered FTP setting dialog 61.

Then, the CPU 71 monitors the transfer destination camera selection operation in step S105, monitors the return operation in step S106, and stands by for another operation in step S107.

As the user operation in the case where the registered FTP setting dialog 61 is displayed, there is the selection operation of the items "delete default", "edit", "copy", "delete", and "select camera to send settings", which are the items on the registered FTP setting dialog 61, or the return operation of the transition button 102.

When the return operation is performed using the transition button 102, the CPU 71 returns to step S101 and returns the display to the FTP upload setting screen 54. That is, the CPU 71 closes the registered FTP setting dialog 61.

The another operation detected in step S107 is the selection operation of any item from "delete default", "edit", "copy", and "delete". When these operations are performed, the CPU 71 performs processing according to the operations.

Step S105 indicates detection of the selection operation of the item "select camera to send settings". In a case of detecting the selection operation of the item "select camera to send settings", the CPU 71 proceeds from step S105 to step S108 and performs camera search processing. This is processing of searching for an imaging device 1 capable of performing Bluetooth communication in the vicinity of the information processing device 2.

Then, after the search processing, the CPU 71 causes the camera list area 130 to display the cameras to which the FTP settings are transferrable on the camera selection screen 55 in step S109. In this case, the CPU 71 displays the imaging devices 1 meeting the condition such as cameras of a specific manufacturer in the camera list area 130 instead of displaying all the Bluetooth-communicable peripheral devices in the camera list area 130.

In the state where the camera selection screen 55 is displayed, the CPU 71 monitors the selection operation of the camera to server as the transfer destination in step S110 and monitors the return operation in step S111.

When detecting the transition button 102 or the return operation by the return button 106 in step S111, the CPU 71 returns to step S101 and returns the display to the FTP upload setting screen 54.

When detecting the selection operation of the camera to serve as the transfer destination, such as the name of a certain imaging device 1 being tapped in the camera list area 130, the CPU 71 proceeds from step S110 to step S113 and confirms whether or not the selected imaging device 1 has already been paired for Bluetooth communication. When the imaging device 1 has been paired, the CPU 71 proceeds to step S120 in FIG. 17.

When the imaging device 1 has not been paired yet, the CPU 71 is paired with the imaging device 1 in step S114 in FIG. 16. When the pairing has succeeded, the CPU 71 proceeds to step S120 in FIG. 17. Note that, in a case where the pairing has failed or in a case where the pairing has been canceled by the user operation, the CPU 71 returns to the operation standby state on the camera selection screen 55 in step S109.

In step S120 in FIG. 17, the CPU 71 performs connection processing for Bluetooth communication. Then, when the connection is completed, the CPU 71 proceeds from step S121 to step S122. Note that, when the communication connection state is not established, the CPU 71 returns to the operation standby state on the camera selection screen 55 in step S109.

When the communication connection is established with the imaging device 1 and the CPU 71 proceeds to step S122, the CPU 71 acquires the information regarding the FTP settings from the imaging device 1. For example, the CPU 71 acquires the information of the number of registration frames in the imaging device 1.

Furthermore, the CPU 71 favorably acquires the information of the setting names set for the registration frames by the user.

Moreover, the CPU 71 favorably acquires the information of the display content of the registration frames in the imaging device 1 as illustrated in FIG. 3.

In step S130, the CPU 71 performs processing of displaying the write destination selection screen 56, using the information acquired from the imaging device 1.

By acquiring at least the information of the number of registration frames in the imaging device 1 that is the Bluetooth communication destination, the CPU 71 becomes able to display the write destination selection screen 56 with the registration frame display area 140, as in FIG. 13C.

Furthermore, by acquiring the information of the setting names for the registration frames set by the user, the CPU 71 becomes able to display the registration frames with the setting names in the registration frame display area 140, as in FIG. 13A.

Moreover, by acquiring the information of the display content of the registration frames in the imaging device 1, the CPU 71 becomes able to display, in the registration frame display area 140, the registration frames with the same information content with the imaging device 1 side, as in FIG. 13B.

In the state where the write destination selection screen 56 is displayed, the CPU 71 monitors the selection operation of the registration frame as the write destination in step S130 and monitors the return operation in step S132.

When detecting the transition button 102 or the return operation by the return button 106 in step S132, the CPU 71 returns to step S109 in FIG. 16 and returns the display to the camera selection screen 55.

When detecting that the user has performed the operation to select a specific registration frame in the registration frame display area 140, the CPU 71 proceeds from step S131 to step S134 and displays the confirmation dialog 62. Then, the CPU 71 stands by for the operation of the OK button 145 in step S135, and stands by for the operation of the cancel button 146 in step S136.

In a case of detecting the operation of the cancel button 146, the CPU 71 returns from step S136 to step S130 and returns the display to the write destination selection screen 56. That is, the CPU 71 closes the confirmation dialog 62.

In a case of detecting the operation of the OK button 145, the CPU 71 proceeds from step S135 to step S140, and executes transfer processing for the FTP setting information to the imaging device 1.

Then, when the transfer of the FTP setting information is completed, the CPU 71 proceeds from step S141 to step S143 and displays the completion dialog 63. Then, the CPU 71 stands by for the operation of the OK button 145 in step S144, returns to step S101 in FIG. 16 according to the operation of the OK button 145, and sets the FTP upload setting screen 54 to be in the display state.

In a case where the transfer of the FTP setting information has not been able to be completed, the CPU 71 proceeds from step S142 to step S145 and displays the error dialog 64. Then, the CPU 71 stands by for the operation of the OK button 145 in step S146, and proceeds to step S147 according to the operation of the OK button 145. In this case, the CPU 71 branches the processing depending on whether or not communication with the imaging device 1 is disconnected. When the communication is being connected, the CPU 71 returns to step S130, and displays the write destination selection screen 56. Thereby, re-execution of transfer of the FTP setting information in another registration frame becomes convenient, for example.

When the communication is disconnected, the CPU 71 returns to step S109 in FIG. 16, and displays the camera selection screen 55. Thereby, re-try from the selection of the transfer destination becomes easy.

The user interface operation for transferring the FTP setting information and execution of the transfer have been performed by the processing in FIGS. 16 and 17 above.

Note that the above processing example is a processing example in the case of selecting one imaging device 1 as the transfer destination and transferring the FTP setting information. However, as described in FIG. 12B, the user may be able to designate a plurality of imaging devices 1 at a time and give an instruction on transfer.

Figure 18:
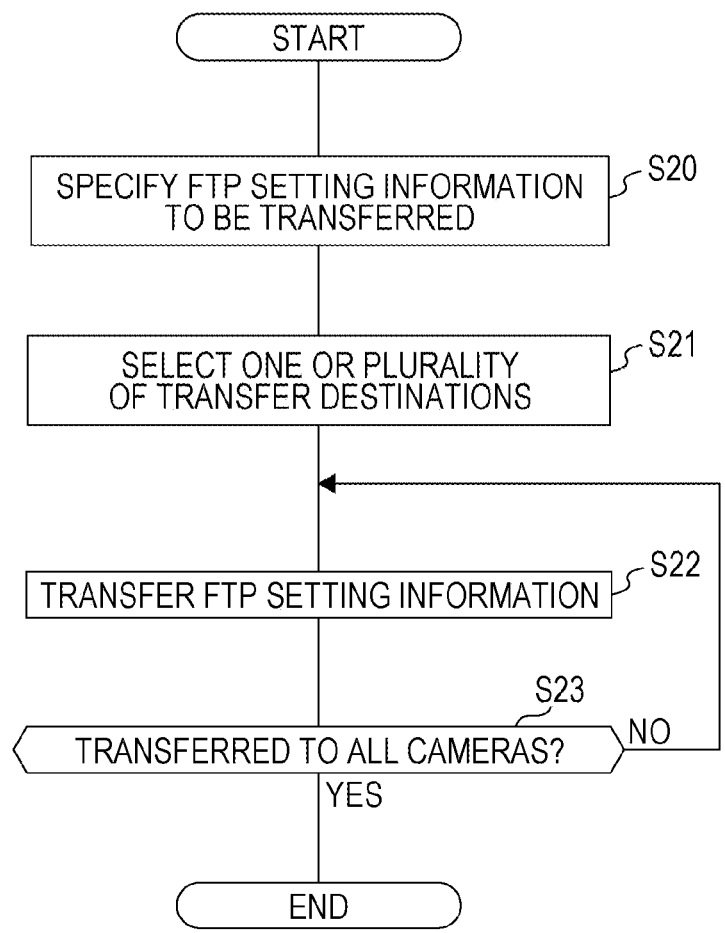
FIG. 18 is a flowchart of transfer processing for the FTP setting information to a plurality of imaging devices according to the first embodiment.

A processing example in that case is illustrated in FIG. 18.

In step S10, the CPU 71 performs processing of specifying the FTP setting information to be transferred. This is processing of specifying a certain piece of FTP setting information as a transfer target, from among the FTP setting information displayed on the FTP upload setting screen 54 by the UI control unit 31.

Specifically, for a certain piece of FTP setting information, the registered FTP setting dialog 61 is displayed by the operation of the action bar 126, and an item of camera selection of the transfer destination is selected, so that the FTP setting information to be transferred is specified.

In step S21, the CPU 71 performs processing of selecting one or a plurality of transfer destinations. That is, the CPU 71 determines one or a plurality of imaging devices 1 as transfer destinations according to the user operation on the camera selection screen 55.

Furthermore, the CPU 71 sequentially displays the write destination selection screen 56 for the one or the plurality of imaging devices 1 specified as the transfer destinations by the UI control unit 31, and performs processing of specifying the registration frame as the write destination according to the user operation.

In step S22, the CPU 71 performs processing of transferring the FTP setting information specified in step S20 to one imaging device 1 as the transfer destination selected in step S21 by the function of the communication control unit 32. The transfer processing may be completed or may end in error.

In step S23, the CPU 71 confirms whether or not the transfer processing has been performed for all the imaging devices 1 specified as the transfer destinations, and performs transfer processing for another imaging device 1 in step S22 when there is still another transfer destination.

When the transfer processing has been performed for all the imaging devices 1 specified as the transfer destinations, the CPU 71 terminates the processing in FIG. 18.

For example, by transferring certain FTP setting information to a plurality of imaging devices 1 as described above, it is convenient for the photographer who performs imaging using a plurality of imaging devices 1 and uploading captured images to a specific FTP server 4.

6. Second Embodiment

As a second embodiment, an example in which an information processing device 2 uploads a captured image to an FTP server 4 will be described.

Figure 19:
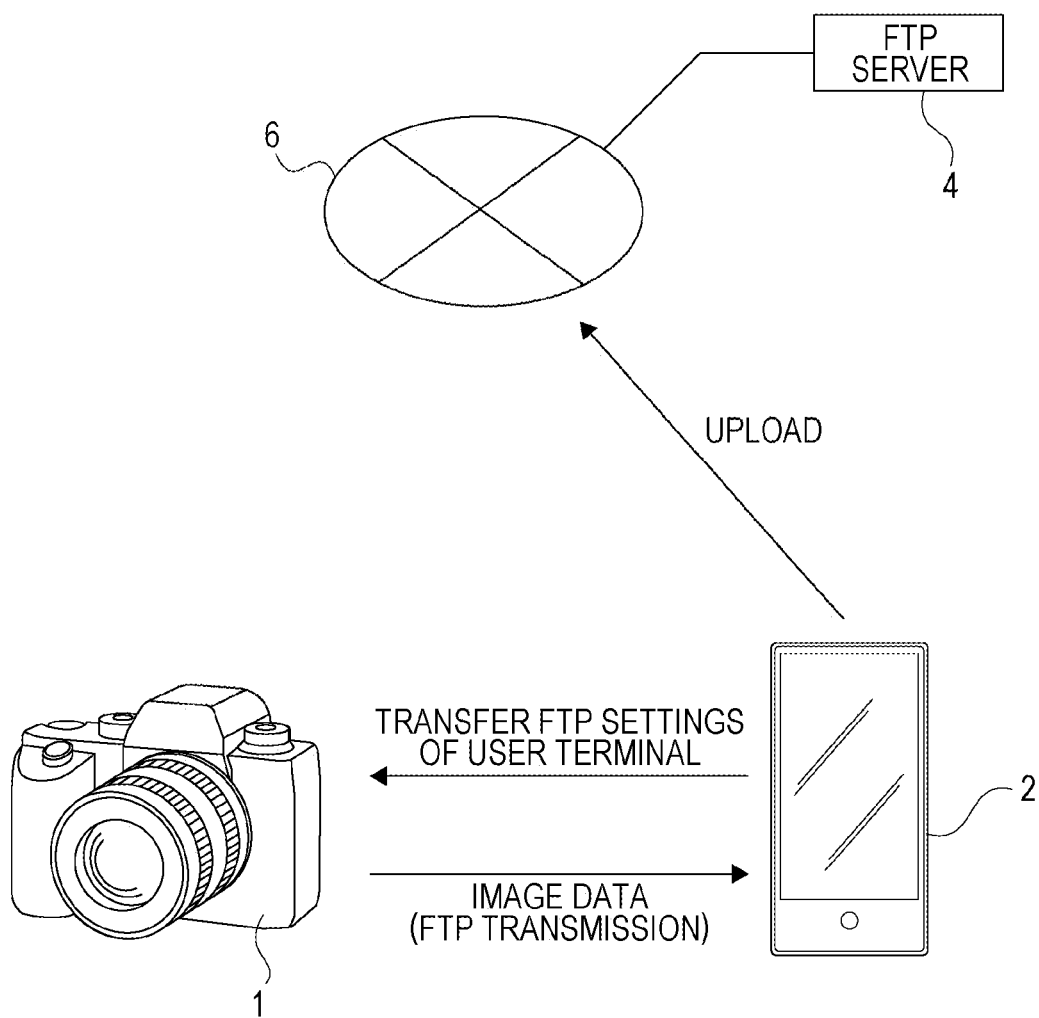
FIG. 19 is an explanatory diagram of transfer of FTP setting information and upload of an image according to a second embodiment.

FIG. 19 illustrates an imaging device 1, an information processing device 2, an FTP server 4, and a network 6, similarly to FIG. 1.

Note that in this case illustrates transmission of image data (image file) captured in the imaging device 1 to the information processing device 2, and upload of image data imported by the information processing device 2 to the FTP server 4.

The information processing device 2 can upload the image file acquired from the imaging device 1 to the FTP server 4 after adding various types of tag information.

In this case, when viewed from the imaging device 1, the information processing device 2 serves as an FTP server, and needs registration of FTP setting information for FTP transmission to the information processing device 2.

However, as described above, inputting FTP setting information by an operation on the imaging device 1 is troublesome work. Therefore, the information processing device 2 transfers FTP setting information for causing the information processing device 2 to serve as an FTP server to the imaging device 1.

Figure 20:
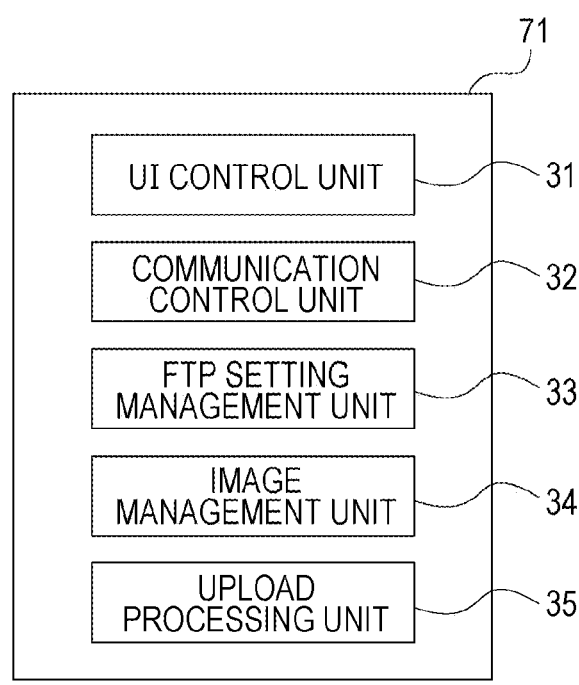
FIG. 20 is an explanatory diagram of a functional configuration of an information processing device according to the second embodiment.

An example of a functional configuration of a CPU 71 of the information processing device 2 in this case is illustrated in FIG. 20. The CPU 71 has functions as a UI control unit 31, a communication control unit 32, and an FTP setting management unit 33, similarly to FIG. 5 above, by an application program.

The UI control unit 31 performs user interface processing for transferring FTP setting information for causing the information processing device 2 to serve as an FTP server to the imaging device 1.

The communication control unit 32 performs processing of transferring the FTP setting information for causing the information processing device 2 to serve as an FTP server to the imaging device 1.

Furthermore, in this example, the CPU 71 has functions as an image management unit 34 and an upload processing unit 35.

The image management unit 34 performs processing of storing and editing the image file transmitted from the imaging device 1 by FTP transmission. For example, the image file may include image data, and metadata added to the image data, sound data, and the like. The image management unit 34 performs image editing, addition of the metadata (addition of tags), processing related to the sound data, and the like.

The upload processing unit 35 performs processing of uploading the image file managed by the image management unit 34 to the FTP server 4.

Figure 21:
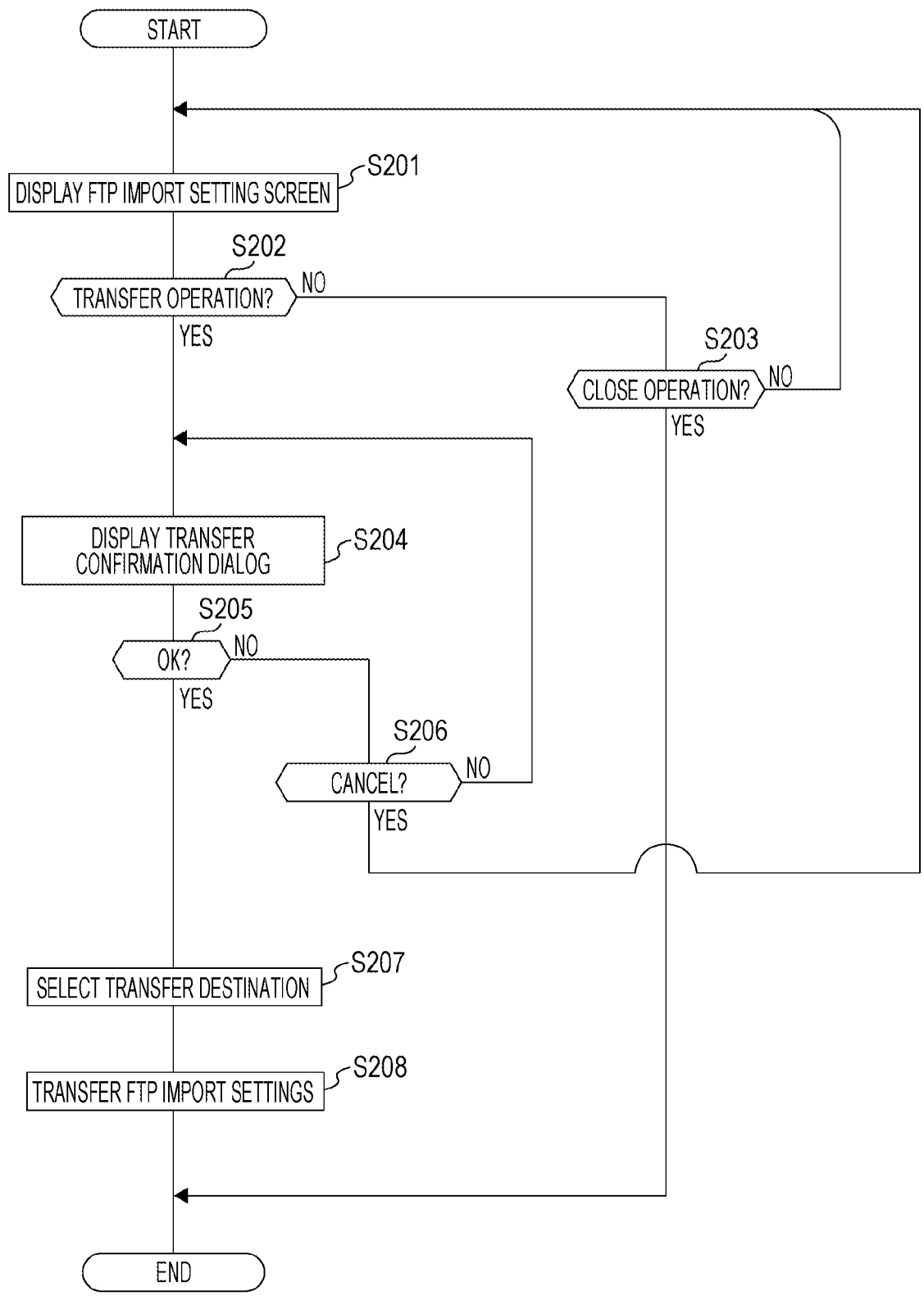
FIG. 21 is a flowchart of transfer processing for the FTP setting information according to the second embodiment.

FIG. 21 illustrates a processing example of the CPU 71 in a case where the information processing device 2 transfers the FTP setting information for causing the information processing device 2 to serve as an FTP server to the imaging device 1, and FIGS. 22A to 22D illustrate screen transitions.

Step S201 in FIG. 21 illustrates processing of the CPU 71 displaying an FTP import setting screen 57.

Figure 22A:
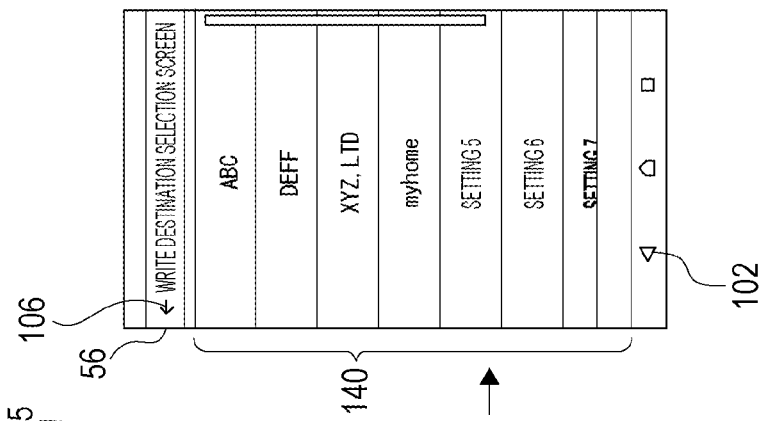
FIGS. 22A to 22D are explanatory diagrams of screen transition regarding transfer of the FTP setting information according to the second embodiment.

For example, when a user selects an "FTP import setting" item on a menu screen 50 in FIG. 6A, the CPU 71 displays the FTP import setting screen 57 as illustrated in FIG. 22A.

On the FTP import setting screen 57, a setting display area 150 is prepared, and items (host name, port number, user name, and the like) of the FTP setting information are displayed. The FTP setting information displayed here is setting information for setting the information processing device 2 to be an FTP server, and is information to be registered in one registration frame in the imaging device 1.

Furthermore, a transfer button 151 and a close button 152 are prepared on the FTP import setting screen 57.

In the state where such an FTP import setting screen 57 is displayed in step S201 in FIG. 21, the CPU 71 monitors an operation of the transfer button 151 in step S202, and stands by for an operation of the close button 152 in step S203.

In a case of detecting the operation of the close button 152, the CPU 71 terminates the processing in FIG. 21 from step S203, and returns the screen to the display state of the menu screen 50, for example.

Figure 22B:
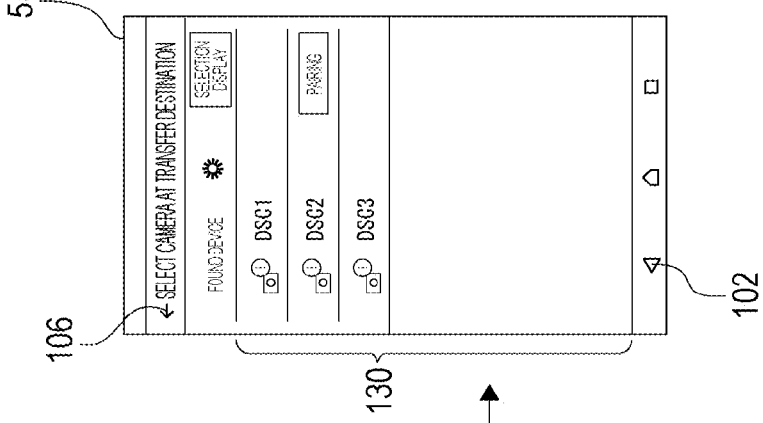

In a case of detecting the operation of the transfer button 151, the CPU 71 proceeds from step S202 to step S204, and displays a transfer confirmation dialog 66 as illustrated in FIG. 22B.

On the transfer confirmation dialog 66, a message 144, an OK button 145, and a cancel button 146 are displayed.

For example, as the message 144, "Are settings to be transferred to camera?" or the like is displayed, asking the user to confirm transfer execution of the FTP settings.

Then, the CPU 71 stands by for the operation of the OK button 145 in step S205, and stands by for the operation of the cancel button 146 in step S206.

In a case of detecting the operation of the cancel button 146, the CPU 71 returns from step S206 to step S201 and returns the display to the FTP import setting screen 57. That is, the CPU 71 closes the transfer confirmation dialog 66.

When the user operates the OK button 145, the CPU 71 proceeds from step S205 to step S207, and performs transfer destination selection processing.

Figure 22C:
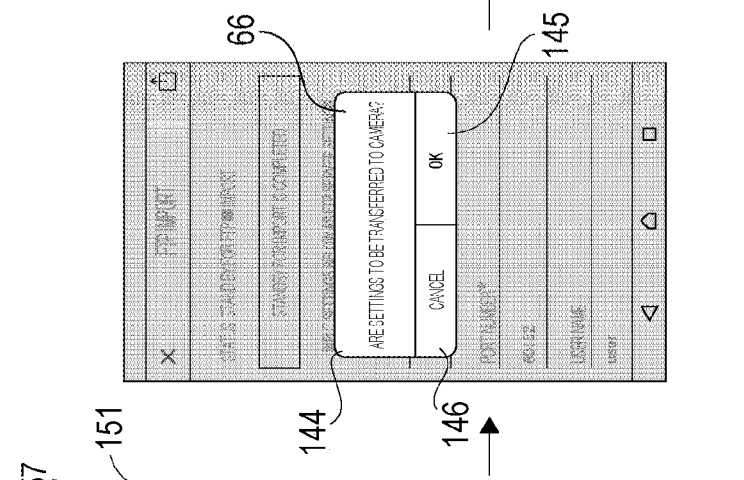

For example, the CPU 71 displays a camera selection screen 55 in FIGS. 22A to 22D, and stands by for a selection operation of the imaging device 1 of a transfer destination by the user. The processing in this case is similar to the processing in the case of transferring the created FTP setting information in the first embodiment. That is, the camera selection screen 55 in FIG. 22C is the same as the camera selection screen 55 in FIG. 10C.

Figure 22D:
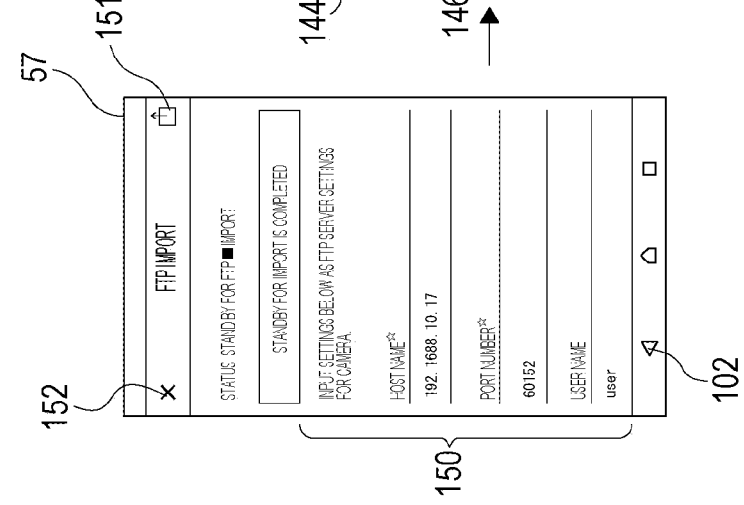

Moreover, when the CPU 71 has specified the imaging device 1 of the transfer destination, the CPU 71 thereafter performs processing of specifying a registration frame of the transfer destination. That is, as illustrated in FIG. 22D, the CPU 71 displays a write destination selection screen 56 similar to FIG. 10D, and specifies the registration frame FTP setting information is to be written according to a user operation.

As described above, the CPU 71 specifies the imaging device 1 of the transfer destination and the registration frame. A more specific example of the processing in step S207 is similar to the processing from step S108 in FIG. 16 to step S135 in FIG. 17 (note that screen transitions by the return operation and the cancel operation are changed as appropriate).

In step S208 in FIG. 21, processing of transferring the FTP import settings, that is, the FTP setting information for causing the information processing device 2 to serve as an FTP server to the imaging device 1 is performed. Specifically, processing similar to the processing from step S140 to step S147 in FIG. 17 is performed (note that a screen transition after transfer completion or transfer failure is changed as appropriate).

By the above processing, the imaging device 1 can store the FTP setting information for the information processing device 2 as one of registration frames, thereby greatly facilitating preparation for transmission of image files to the information processing device 2.

7. Third Embodiment

As a third embodiment, an example in which an information processing device 2 edits FTP setting information registered in an imaging device 1 will be described.

Figure 23:
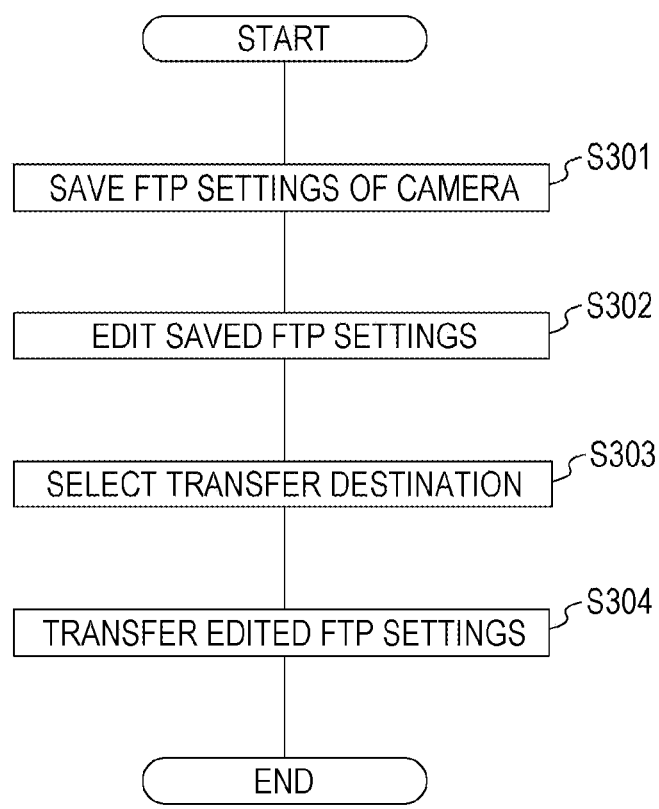
FIG. 23 is a flowchart of transfer processing for FTP setting information according to a third embodiment.

FIG. 23 illustrates a processing example of a CPU 71 of the information processing device 2.

In step S301, the CPU 71 acquires FTP setting information stored as one registration frame in the imaging device 1, and stores the FTP setting information in a storage unit 79, for example. For example, the CPU 71 performs necessary communication to display a list of the FTP setting information in the imaging device 1, and prompts the user to select the FTP setting information. Then, the CPU 71 requests the imaging device 1 to send the selected FTP setting information, and receives and stores the FTP setting information.

The FTP setting information stored in this way can be edited as with the FTP setting information created by the information processing device 2. For example, in the FTP setting display area 104 on the FTP setting screen 51 in FIG. 6B, FTP setting information imported and saved from the imaging device 1 is also displayed. Therefore, as described with reference to FIG. 6C, editing processing can be performed for the FTP setting information.

Step S302 in FIG. 23 indicates that the CPU 71 performs such editing processing.

The FTP setting information edited in this way can be transferred to the imaging device 1 as with the FTP setting information newly created or edited by the information processing device 2.

That is, the CPU 71 performs processing of selecting the imaging device 1 of the transfer destination and the registration frame as the transfer destination in step S303. In this case, the user is only required to select the original imaging device 1 and the registration frame of the FTP setting information. Of course, transfer to a different imaging device 1 or a different registration frame is also possible.

Then, in step S304, the CPU 71 performs processing of transferring the edited FTP setting information to the transfer destination specified in step S303.

That is, by executing the editing and transfer processing for the FTP setting information described in the first embodiment, for the FTP setting information imported from the imaging device 1, editing of the FTP setting information registered in the imaging device 1 can be easily performed using the information processing device 2.

8. Fourth Embodiment

As a fourth embodiment, performing FTP upload connection confirmation before transferring FTP setting information to an imaging device 1 after creating and editing the FTP setting information in an information processing device 2 will be described.

For example, even after the FTP setting information is created by the information processing device 2 and transferred to the imaging device 1, whether the setting will work correctly is not known until an image file is actually uploaded to an FTP server 4. Therefore, it is desirable to confirm whether or not content of the FTP setting information can correctly upload image files before transferring the FTP setting information from the information processing device 2 to the imaging device 1.

Figure 24A:
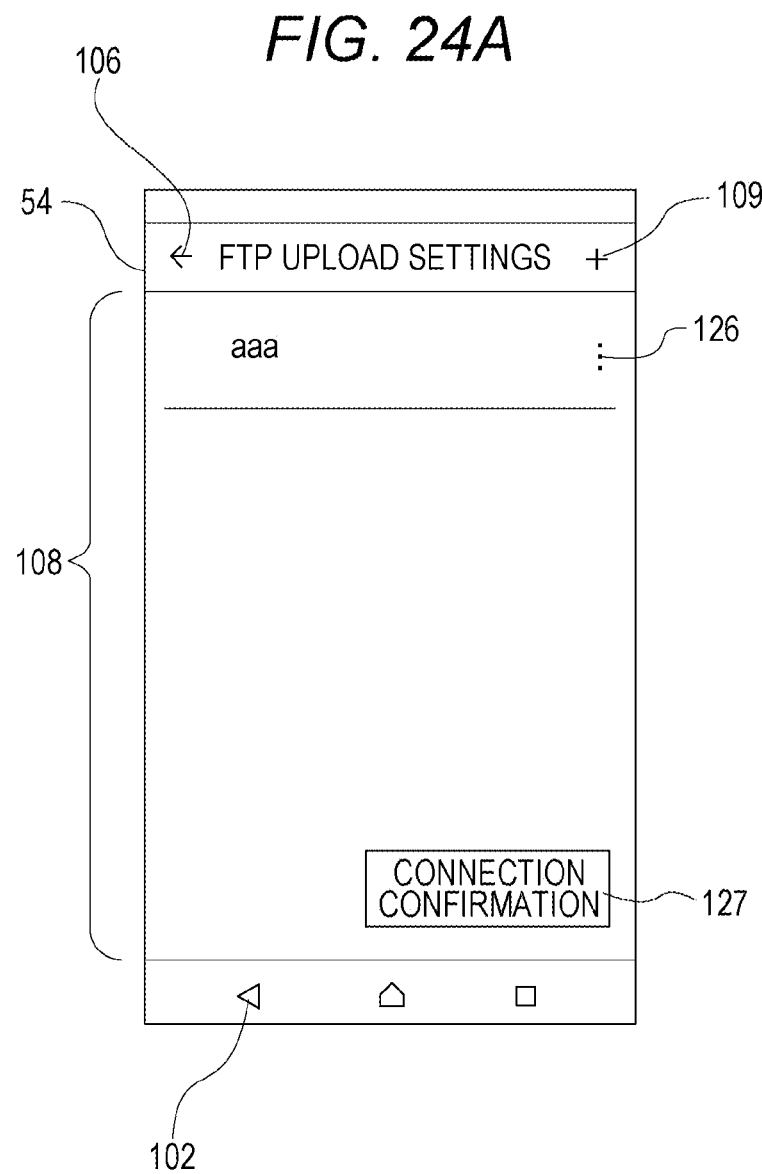
FIGS. 24A to 24C are explanatory diagrams of FTP upload connection confirmation according to a fourth embodiment.

Therefore, for example, as illustrated in FIG. 24A, a connection confirmation button 127 is provided on an FTP upload setting screen 54.

When the connection confirmation button 127 is tapped, an FTP upload test is performed with content of current FTP setting information, and a result is displayed on the screen.

Figure 24B:
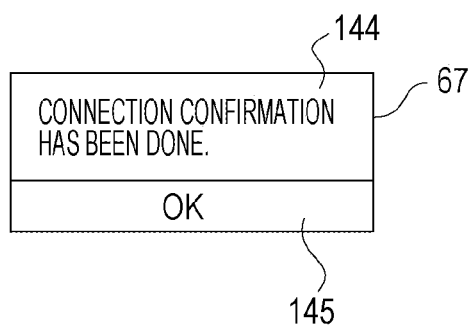

For example, when the test has been done without problem, a message 144 and an OK button 145 on a completion dialog in FIG. 24B are displayed.

Figure 24C:
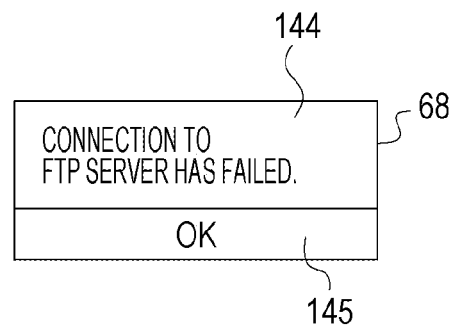

When an error has occurred, a message 144 and an OK button 145 on an error dialog in FIG. 24C are displayed.

Figure 25:
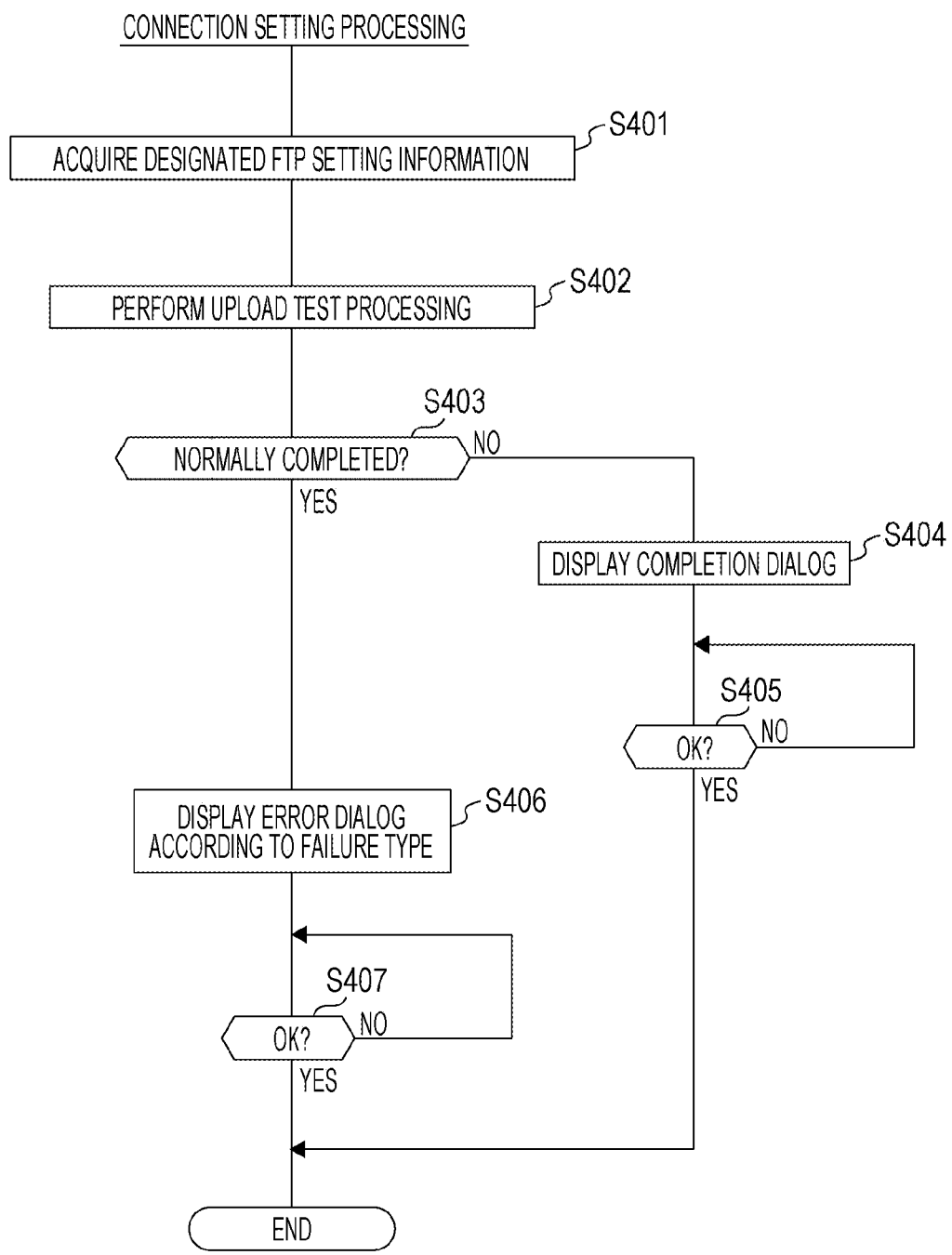
FIG. 25 is a flowchart of FTP upload connection confirmation processing according to the fourth embodiment.

A processing example by the CPU 71 is illustrated in FIG. 25.

For example, the CPU 71 starts processing in FIG. 25 in response to an operation of the connection confirmation button 127, and first acquires FTP setting information designated in step S401 for processing. It is conceivable that items of the FTP setting information used for confirmation are "host name", "connection type", "port number", "transfer mode", "user name", and "password".

In step S402, the CPU 71 attempts FTP connection and login using the acquired information as upload test processing.

Then, when the FTP connection and the login have been normally completed, the CPU 71 proceeds from step S403 to step S404 and displays a completion dialog 67. Then, when detecting the operation of the OK button 145, the CPU 71 terminates the processing from step S405.

Meanwhile, in a case where the FTP connection and the login have not been able to be normally completed, the CPU 71 proceeds from step S403 to step S406 and displays an error dialog 68. The message 144 in this case is desirably content corresponding to the type of failure.

Then, when detecting the operation of the OK button 145, the CPU 71 terminates the processing from step S407.

The types of failure include unable to connect to the FTP server 4, failure of login to FTP server 4, occurrence of an error during establishment of SSL communication, timeout, disconnected to a network, and failure of command communication. Therefore, in the error dialog 68, the messages 144 corresponding to these types are displayed so that the user can take an action for the failure.

By the above processing in FIG. 25, the user can verify the FTP setting information before transferring the FTP setting information to the imaging device 1.

9. Conclusion and Modification

In the above embodiments, the following effects can be obtained.

The information processing device 2 of the embodiment the UI control unit 31 that performs the user interface processing of presenting a communicable imaging device and enabling an operation to designate an imaging device to serve as a transfer destination, and the communication control unit 32 that executes transfer of FTP setting information to the imaging device 1 designated by the user interface processing.

Thereby, the FTP settings held in the information processing device 2 can be transferred to the imaging device 1 designated by the user.

When the FTP settings are appropriately set in the imaging device 1, the captured image files and the like can be uploaded from the imaging device 1 to the FTP server 4. However, the user operating the imaging device 1 and inputting the FTP setting information is troublesome. In the case of the present embodiment, the FTP setting held by the information processing device 2 is transferred to the imaging device 1, so that the appropriate FTP setting information is stored in the imaging device 1 without performing the input operation of the FTP setting information in the imaging device 1. Therefore, preparation for uploading the image files from the imaging device 1 to the FTP server 4 becomes extremely simple.

In particular, in the case of professional photographers, image data captured in various event venues such as sports, incident/accident scenes, interviewees, and the like are uploaded as is from the imaging device 1 to the FTP server 4 in a newspaper company, or the like, and the photographers want to facilitate the work necessary therefor. For this reason, it is extremely convenient to be able to easily transfer the FTP setting information registered in the information processing device 2 such as a smartphone to the imaging device 1.

In the information processing device 2 according to the embodiment, the UI control unit 31 performs the processing of presenting the input environment for creating the FTP setting information (see FIGS. 6C and 7). Then, the FTP setting management unit 33 that creates the FTP setting information according to the input in the input environment is included.

That is, the FTP setting information is made able to be created according to user input in the information processing device 2.

Thereby, the FTP setting information created in the information processing device 2 can be transferred to and reflected in the imaging device 1. In particular, in a case of uploading a captured image to a new FTP server 4, inputting the FTP settings in the imaging device 1 is troublesome and difficult work. Meanwhile, in the information processing device 2 such as a smartphone, various inputs are extremely easier than the inputs in the imaging device 1. Therefore, the user can input/create the FTP setting information in an environment more suitable for input and transfer the FTP setting information to the imaging device 1.

Note that the provision of the input environment is not limited to the input using the creation/editing screen 52 in FIG. 6C, for example, and various examples are assumed. For example, the FTP settings can be made created by receiving a sound input by user's voice.

In the information processing device 2 according to the embodiment, the UI control unit 31 performs the processing of presenting the input environment for creating the FTP setting information (see FIG. 6C). Then, the FTP setting management unit 33 that creates the FTP setting information according to the input in the input environment is included.

That is, the FTP setting information stored in the information processing device can be edited, or set as new FTP setting information by the user input.

Thereby, the FTP setting information edited in the information processing device 2 can be transferred to and reflected in the imaging device 1. Furthermore, by editing the FTP setting information processing device 2, the user can perform necessary modification and create new FTP setting information by editing, and modification and creation of the FTP setting information are facilitated. Then, the edited FTP setting information can be transferred to the imaging device 1.

In the information processing device 2 according to the embodiment, the UI control unit 31 performs the processing of displaying a list of all or part of communicable imaging devices according to processing of searching for an imaging device 1 capable of wireless communication (see FIGS. 10C and 12A and 12B, and steps S108 and S109 in FIG. 16).

Thereby, the user can confirm the imaging device 1 to which the FTP setting information can be transferred from the information processing device 2.

Furthermore, by displaying only the imaging device of a predetermined manufacturer or only appropriate model, instead of all the imaging devices 1 capable of wireless information transfer, the imaging device 1 in which the FTP setting information can be reflected when transferred can be displayed. As a result, the imaging device 1 for which transfer of the FTP setting information is wasteful can be undisplayed as a transfer destination candidate in the first place, and the display is not complicated and is easy for the user to use.

In the embodiment, the wireless communication between the information processing device 2 and the imaging device 1 is short-range wireless communication. The short-range wireless communication here refers to wireless communication with a short communication distance, and specifically corresponds to communication with standards such as Bluetooth, Wi-Fi, or NFC, infrared communication, or information transmission using QR codes.

Thereby, the FTP setting information can be transferred in an environment where the information processing device 2 and the imaging device 1 can communicate with each other by short-range wireless communication.

In the embodiment, the UI control unit 31 performs the processing of detecting the operation to select an imaging device to serve as a transfer destination of the FTP setting information, as an operation for the list displaying imaging devices 1 (FIGS. 10C and 12A and 12B and steps S109 and S110 in FIG. 16).

That is, the user can select the imaging device 1 of the transfer destination on the camera list area 130 on the camera selection screen 55.

Thereby, the user can easily specify the imaging device 1 to which the FTP setting information is to be transferred from the information processing device 2.

In particular, not all the imaging devices 1 capable of wireless information transfer but an imaging device (for example, an imaging device of a predetermined manufacturer) in which transfer of the FTP setting information is effective is displayed in the list display, whereby there is no ineffective designation input and the operability is improved.

Furthermore, since an imaging device capable of short-range wireless communication can be selected, the user can select the transfer destination by operating the information processing device 2 in the vicinity of the imaging device, which is a convenient interface when assuming a professional photographer's news gathering site, or the like.

In the embodiment, the UI control unit 31 performs the processing of detecting a plurality of imaging devices 1 to serve as the transfer destinations of the FTP setting information, as the operation for the list displaying imaging devices 1 (see FIGS. 12B and 18).

That is, the user can designate a plurality of imaging devices 1 of the transfer destinations on the camera list area 130 on the camera selection screen 55.

Thereby, the user can easily specify the plurality of imaging devices 1 to which the FTP setting information is to be transferred from the information processing device 2 at the same time.

For example, there are some cases where a professional photographer uses a plurality of imaging devices 1 at a news gathering site or the like. In such a case, a convenient operation environment can be provided when the photographer wants to collectively transfer the FTP setting information.

In the embodiment, an example in which the UI control unit 31 performs the processing of displaying information regarding FTP settings in the imaging device 1 that serves as the transfer destination of the FTP setting information (see FIGS. 10D and 13A to 13C).

Various examples are assumed for the information regarding FTP settings, such as registration frame information, the number of registration frames, information of presence or absence of registration of each registration frame, and information of the FTP server of each FTP setting.

On the write destination selection screen 56, the information regarding FTP settings in the imaging device 1 as a transfer destination, whereby the user can confirm the FTP setting status on the imaging device 1 side.

In the embodiment, an example has been described in which the UI control unit 31 performs processing of executing display of a registration frame of an FTP setting in the imaging device 1 to serve as a transfer destination of the FTP setting information, and detecting an operation to select a registration frame to serve as a write destination of the FTP setting information (see FIGS. 13A, 13B, and 13C).

On the write destination selection screen 56, the registration frame in the imaging device 1 to serve as the transfer destination is displayed in the registration frame display area 140, whereby the user can select an arbitrary registration frame as the write destination after recognizing each registration frame. Therefore, for example, in a case where a large number of FTP settings are saved, the write destination can be appropriately designated for each registration frame, whereby the FTP settings can be saved on the imaging device 1 side in an easy-to-use state for the user.

In the embodiment, an example has been described in which the UI control unit 31 displays the registration frame of an FTP setting in the imaging device 1 to serve as a transfer destination of the FTP setting information, with a setting name given to each registration frame (see FIGS. 13A and 13B).

In the registration frame display area 140 on the write destination selection screen 56, the registration frame in the imaging device 1 to serve as the transfer destination is displayed with the setting name, whereby the user can easily recognize the content of each registration frame. Therefore, the user can appropriately select the registration frame to serve as the write destination.

In the embodiment, an example has been described in which the UI control unit 31 displays the registration frame of an FTP setting in the imaging device 1 to serve as a transfer destination of the FTP setting information, with the same information as the information displayed in the imaging device 1 (see FIG. 13B).

In the registration frame display area 140 on the write destination selection screen 56, the registration frame is displayed with the same information as the information displayed in the imaging device 1 to serve as the transfer destination. For example, in a case where the information of the number (or serve number) of the registration frame and the setting name is displayed on the display unit 15 of the imaging device 1, such as "server 1 ABC" and "server 2 DEFF" as illustrated in FIG. 3, the same information is displayed on the write destination selection screen 56 of the information processing device 2, such as "server 1 ABC" and "server 2 DEFF" in FIG. 13B. By displaying the registration frame on the imaging device 1 side and the information processing device 2 side using the common information, the user is allowed to select the write destination in an easy-to-understand state.

In the embodiment, various devices are assumed as the information processing device 2, and in particular, a portable terminal device such as a smartphone or a tablet device is desirable.

Since the information processing device 2 is a mobile terminal device such as a smartphone or a tablet device, the photographer can easily construct an environment to transfer FTP setting information to the imaging device 1 using the information processing device 2, and upload the FTP setting information from the imaging device 1 to the FTP server 4 in an event venue, a news gathering site, or the like.

In the third embodiment, the communication control unit 32 executes communication for acquiring the FTP setting information stored in the imaging device 1 from the communicable imaging device 1, and the UI control unit 31 performs the processing of providing the input environment (see FIGS. 6C and 7) for editing the FTP setting information acquired from the imaging device 1. Then, the FTP setting management unit 33 performs the processing of editing the FTP setting information acquired from the imaging device 1 according to the input in the input environment (see FIG. 23).

That is, the FTP setting information stored in the imaging device 1 side can be imported and edited on the information processing device 2 side.

The information processing device 2 acquires the FTP setting information stored in the imaging device 1, thereby editing the FTP setting information. The FTP setting information for which editing has been performed such as changing a part of FTP setting information content can be the FTP setting information written in the original registration frame of the imaging device 1 and written in a new registration frame.

Therefore, the processing according to the embodiment enables not only transfer and writing of the FTP setting information created or edited after created in the information processing device 2 to the imaging device 1 but also update of the FTP setting information registered in the imaging device 1 and registration of new FTP setting information based on the FTP setting information registered in the imaging device 1.

In the second embodiment, it has been described that the communication control unit 32 performs the processing of transferring the FTP setting information for causing the information processing device 2 to serve as an FTP server to the imaging device 1 (see FIG. 21).

For example, in the case where the imaging device 1 transmits image data and the like to the information processing device 2, the information processing device 2 serves as an FTP server. The FTP setting information in this case is transferred to the imaging device 1.

As a result, an environment for the imaging device 1 to transmit image data and the like to the information processing device 2 can be easily realized. This is because input of the FTP settings to the information processing device 2 by the user operation on the imaging device 1 is not necessary.

In the fourth embodiment, an example of performing the processing of confirming availability of upload connection by the FTP setting information before executing transfer of the FTP setting information to the imaging device has been described (see FIG. 25).

For example, before transferring the FTP setting information to the imaging device 1, whether or not the FTP setting information can be connected to a predetermined FTP server 4 is confirmed. Thereby, the correct FTP setting information can be transferred to the imaging device 1.

The program according to the embodiment is a program for causing the CPU, DSP, and the like, or a device including the CPU and DSP to execute the processing in FIGS. 15 to 18. The program may further cause the CPU and the like to execute the processing in FIGS. 21, 23, and 25.

That is, the program according to the embodiment is a program for causing the information processing device 2 to execute the UI processing of presenting a communicable imaging device 1 and enabling an operation to designate an imaging device to serve as a transfer destination, and the communication control processing of executing transfer of FTP setting information to the imaging device 1 designated by the UI processing.

By such a program, the above-described information processing device 2 can be realized in, for example, a portable terminal device, a personal computer, or another equipment that can execute information processing.

Such a program for realizing such an information processing device 2 can be recorded in advance in an HDD as a recording medium built in a device such as a computer device, a ROM in a microcomputer having a CPU, or the like.

Alternatively, the program can be temporarily or permanently stored (recorded) on a removable recording medium such as a flexible disk, a compact disc read only memory (CD-ROM), a magneto optical (MO) disk, a digital versatile disc (DVD), a Blu-ray disc (registered trademark), a magnetic disk, a semiconductor memory, or a memory card. Such a removable recording medium can be provided as so-called package software.

Furthermore, such a program can be installed from a removable recording medium to a personal computer or the like, and can also be downloaded from a download site via a network such as a local area network (LAN) or the Internet.

Furthermore, such a program is suitable for providing a wide range of the information processing device 2 of the embodiment. For example, by downloading a program to a portable terminal device such as a smartphone or a tablet, a mobile phone, a personal computer, a game device, a video device, a personal digital assistant (PDA), or the like, the smartphone or the like can be caused to function as the information processing device 2 of the present disclosure.

Note that the effects described in the present specification are merely examples and are not limited, and other effects may be exhibited.

Note that the present technology can also have the following configurations.

(1)
An information processing device including:
a user interface control unit configured to perform user interface processing of presenting a communicable imaging device and enabling an operation to designate an imaging device to serve as a transfer destination; and
a communication control unit configured to execute transfer of FTP setting information to the imaging device designated by the user interface processing.

(2)
The information processing device according to (1), further including:
an FTP setting management unit configured to create FTP setting information according to an input in an input environment for creating FTP setting information to be provided by the user interface control unit.

(3)
The information processing device according to (1) or (2), further including:
an FTP setting management unit configured to edit FTP setting information according to an input in an input environment for editing FTP setting information provided by the user interface control unit.

(4)
The information processing device according to any one of (1) to (3), in which
the user interface control unit performs processing of displaying a list of all or part of communicable imaging devices according to processing of searching for an imaging device capable of wireless communication.

(5)
The information processing device according to (4), in which
the wireless communication is short-range wireless communication.

(6)
The information processing device according to (4) or (5), in which
the user interface control unit performs processing of detecting an operation to select an imaging device to serve as a transfer destination of the FTP setting information, as an operation for the list displaying imaging devices.

(7)
The information processing device according to (4) or (5), in which
the user interface control unit performs processing of detecting an operation to select a plurality of imaging devices to serve as transfer destinations of the FTP setting information, as an operation for the list displaying imaging devices.

(8)
The information processing device according to any one of (1) to (7), in which
the user interface control unit performs processing of displaying information regarding an FTP setting in an imaging device to serve as a transfer destination of the FTP setting information.

(9)
The information processing device according to any one of (1) to (8), in which
the user interface control unit performs processing of executing display of a registration frame of an FTP setting in the imaging device to serve as a transfer destination of the FTP setting information, and detecting an operation to select a registration frame to serve as a write destination of the FTP setting information.

(10)
The information processing device according to (9), in which
the user interface control unit displays the registration frame of an FTP setting in the imaging device to serve as a transfer destination of the FTP setting information, with a setting name given to each registration frame.

(11)
The information processing device according to (9), in which
the user interface control unit displays the registration frame of an FTP setting in the imaging device to serve as a transfer destination of the FTP setting information, with same information as information displayed in the imaging device.

(12)

The information processing device according to any one of (1) to (11), in which the information processing device is a portable terminal device.

(13)

The information processing device according to any one of (1) to (12), further including:
an FTP setting management unit configured to edit FTP setting information acquired from the communicable imaging device according to an input in an input environment for editing the FTP setting information provided by the user interface control unit.

(14)

The information processing device according to any one of (1) to (13), in which
the communication control unit performs processing of transferring FTP setting information for causing the information processing device to serve as an FTP server to the imaging device.

(15)

The information processing device according to any one of (1) to (14) configured to perform
processing of confirming availability of upload connection by the FTP setting information before executing transfer of the FTP setting information to the imaging device.

(16)

An information processing method in which an information processing device executes:
user interface processing of presenting a communicable imaging device and enabling an operation to designate an imaging device to serve as a transfer destination; and
communication control processing of executing transfer of FTP setting information to the imaging device designated by the user interface processing.

(17)

A program for causing an information processing device to execute:
user interface processing of presenting a communicable imaging device and enabling an operation to designate an imaging device to serve as a transfer destination; and
communication control processing of executing transfer of FTP setting information to the imaging device designated by the user interface processing.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 Imaging device
2 Information processing device
4 FTP server
6 Network
13 Camera signal processing unit
14 Recording control unit
15 Display unit
16 Communication unit
17 Operation unit
18 Camera control unit
19 Memory unit
25 Sound input unit
26 Sound processing unit
31 UI control unit
32 Communication control unit
33 FTP setting management unit
34 Image management unit
35 Upload processing unit
50 Menu screen
51 FTP setting screen
52 Creation/editing screen
53 Top screen
54 FTP upload setting screen
55 Camera selection screen
56 Write destination selection screen
57 FTP import setting screen
61 Registered FTP setting dialog
62 Confirmation dialog
63 Completion dialog
64 Error dialog
65 Processing selection dialog
66 Transfer confirmation dialog
67 Completion dialog
68 Error dialog
70 Information processing device
71 CPU
72 ROM
73 RAM
76 Input unit
77 Display unit
78 Sound output unit
79 Storage unit
80 Communication unit

The invention claimed is:

1. An information processing device comprising:
circuitry configured to
perform user interface processing of presenting a communicable imaging device and enabling input of an operation to designate an imaging device to serve as a transfer destination, and
execute transfer of file transfer protocol (FTP) setting information to the imaging device designated by the user interface processing, wherein
the circuitry is configured to edit FTP setting information according to an input in an input environment for editing FTP setting information.

2. The information processing device according to claim 1,
wherein the circuitry is configured to create FTP setting information according to an input in an input environment for creating FTP setting information.

3. The information processing device according to claim 1, wherein
the circuitry is configured to perform processing of displaying a list of all or part of communicable imaging devices according to processing of searching for an imaging device capable of wireless communication.

4. The information processing device according to claim 3, wherein
the wireless communication is short-range wireless communication.

5. The information processing device according to claim 3, wherein
the circuitry is configured to perform processing of detecting an operation to select an imaging device to serve as a transfer destination of the FTP setting information, as an operation for the list displaying imaging devices.

6. The information processing device according to claim 3, wherein
the circuitry is configured to perform processing of detecting an operation to select a plurality of imaging devices to serve as transfer destinations of the FTP setting information, as an operation for the list displaying imaging devices.

7. The information processing device according to claim 1, wherein
the circuitry is configured to perform processing of displaying information regarding an FTP setting in an imaging device to serve as a transfer destination of the FTP setting information.

8. The information processing device according to claim 1, wherein
the circuitry is configured to perform processing of executing display of a registration frame of an FTP setting in the imaging device to serve as a transfer destination of the FTP setting information, and detecting an operation to select a registration frame to serve as a write destination of the FTP setting information.

9. The information processing device according to claim 8, wherein
the circuitry is configured to display the registration frame of an FTP setting in the imaging device to serve as a transfer destination of the FTP setting information, with a setting name given to each registration frame.

10. The information processing device according to claim 8, wherein
the circuitry is configured to display the registration frame of an FTP setting in the imaging device to serve as a transfer destination of the FTP setting information, with same information as information displayed in the imaging device.

11. The information processing device according to claim 1, wherein
the information processing device is a portable terminal device.

12. The information processing device according to claim 1,
wherein the circuitry is configured to edit FTP setting information acquired from the communicable imaging device according to an input in an input environment for editing the FTP setting information.

13. The information processing device according to claim 1, wherein
the circuitry is configured to perform processing of transferring FTP setting information for causing the information processing device to serve as an FTP server to the imaging device.

14. The information processing device according to claim 1, wherein the circuitry is configured to perform processing of confirming availability of upload connection by the FTP setting information before executing transfer of the FTP setting information to the imaging device.

15. An information processing method that causes an information processing device to execute:
user interface processing of presenting a communicable imaging device and enabling input of an operation to designate an imaging device to serve as a transfer destination; and
communication control processing of executing transfer of file transfer protocol (FTP) setting information to the imaging device designated by the user interface processing, wherein
the information processing method further causes the information processing device to execute editing FTP setting information according to an input in an input environment for editing FTP setting information.

16. A program, stored on a non-transitory storage medium, for causing an information processing device to execute:
user interface processing of presenting a communicable imaging device and enabling input of an operation to designate an imaging device to serve as a transfer destination; and
communication control processing of executing transfer of file transfer protocol (FTP) setting information to the imaging device designated by the user interface processing, wherein
the program further causes the information processing device to execute editing FTP setting information according to an input in an input environment for editing FTP setting information.

* * * * *